United States Patent
Inoue

(10) Patent No.: US 8,849,061 B2
(45) Date of Patent: Sep. 30, 2014

(54) NOISE REDUCTION DEVICE AND NOISE REDUCTION METHOD

(71) Applicant: Panasonic Corporation, Osaka (JP)

(72) Inventor: Tadayuki Inoue, Hyogo (JP)

(73) Assignee: Panasonic Corporation, Osaka (JP)

( * ) Notice: Subject to any disclaimer, the term of this patent is extended or adjusted under 35 U.S.C. 154(b) by 162 days.

(21) Appl. No.: 13/710,771

(22) Filed: Dec. 11, 2012

(65) Prior Publication Data

US 2013/0242197 A1   Sep. 19, 2013

(30) Foreign Application Priority Data

Mar. 13, 2012 (JP) ................................. 2012-055574
Jul. 25, 2012 (JP) ................................. 2012-164654

(51) Int. Cl.
*G06K 9/40* (2006.01)
*H04N 5/21* (2006.01)
*G06T 5/00* (2006.01)

(52) U.S. Cl.
CPC ........ *H04N 5/21* (2013.01); *G06T 2207/10024* (2013.01); *G06T 5/004* (2013.01)
USPC ............................. 382/275; 382/254; 382/274

(58) Field of Classification Search
USPC .......... 382/254, 274, 275; 348/348, 606, 624, 348/607; 358/1.9, 3.31, 447, 461, 463
See application file for complete search history.

(56) References Cited

U.S. PATENT DOCUMENTS

| 6,081,917 A | 6/2000 | Yasui et al. |
| 7,415,167 B2 * | 8/2008 | Komiya et al. ............... 382/284 |
| 2007/0268410 A1* | 11/2007 | Chen ............................. 348/624 |
| 2008/0180556 A1 | 7/2008 | Egawa |
| 2011/0134292 A1* | 6/2011 | Hirai ............................ 348/280 |

FOREIGN PATENT DOCUMENTS

| JP | 9-284783 A | 10/1997 |
| JP | 2000-106630 A | 4/2000 |
| JP | 2008-187274 A | 8/2008 |

* cited by examiner

*Primary Examiner* — Ali Bayat
(74) *Attorney, Agent, or Firm* — Renner, Otto, Boisselle & Sklar, LLP

(57) ABSTRACT

A noise reduction section includes: a correlation detector configured to detect correlations between corresponding pixels between first and second image signals which are obtained from an identical image, and output degrees of correlation based on the detected correlations; an addition ratio determining section configured to determine addition ratios of the corresponding pixels between the first and second image signals based on the degrees of correlation, where the addition ratios are used in weighted addition averaging processes; and a weighted addition averaging section configured to perform, based on the addition ratios, the weighted addition averaging processes on the corresponding pixels to generate an output image signal, wherein when each of the degrees of correlation is relatively high, the addition ratio determining section provides a relatively high proportion of the pixel of the second image signal in the addition ratio.

19 Claims, 24 Drawing Sheets

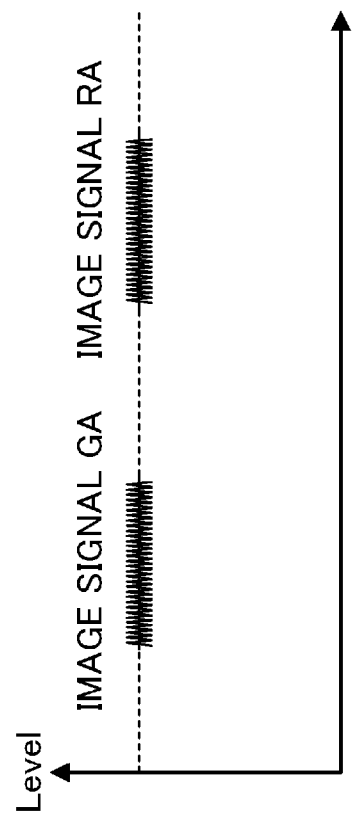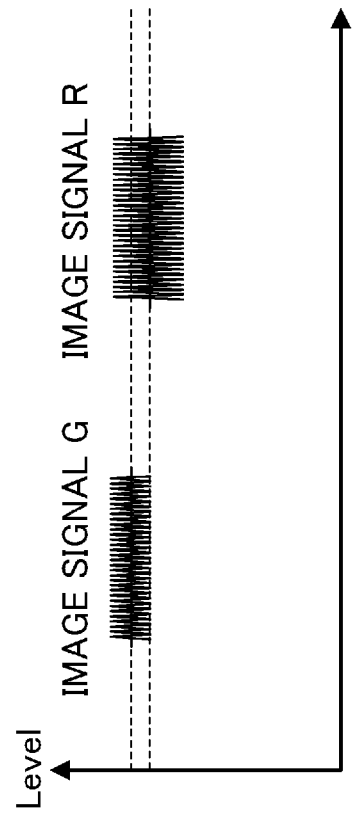

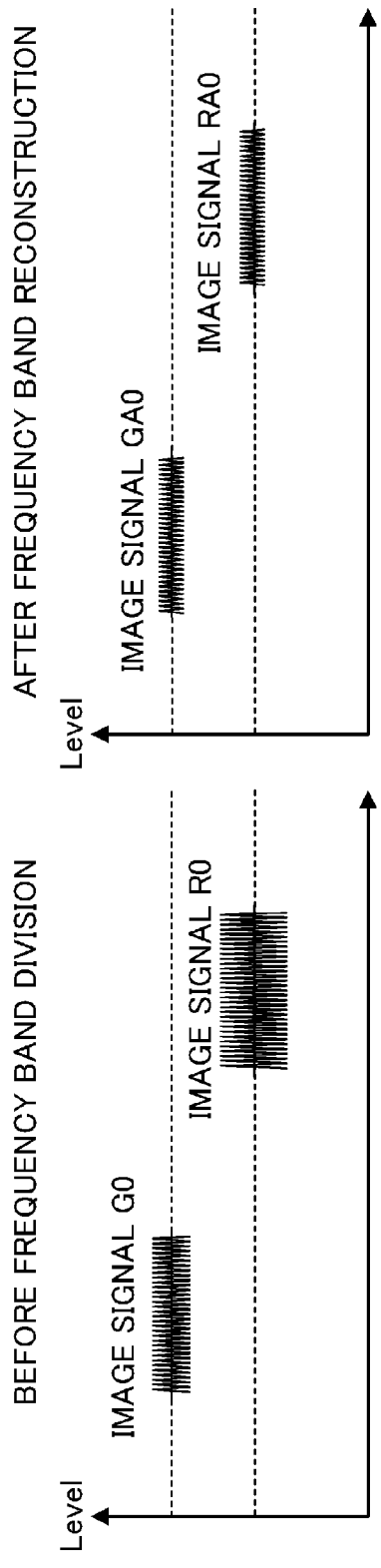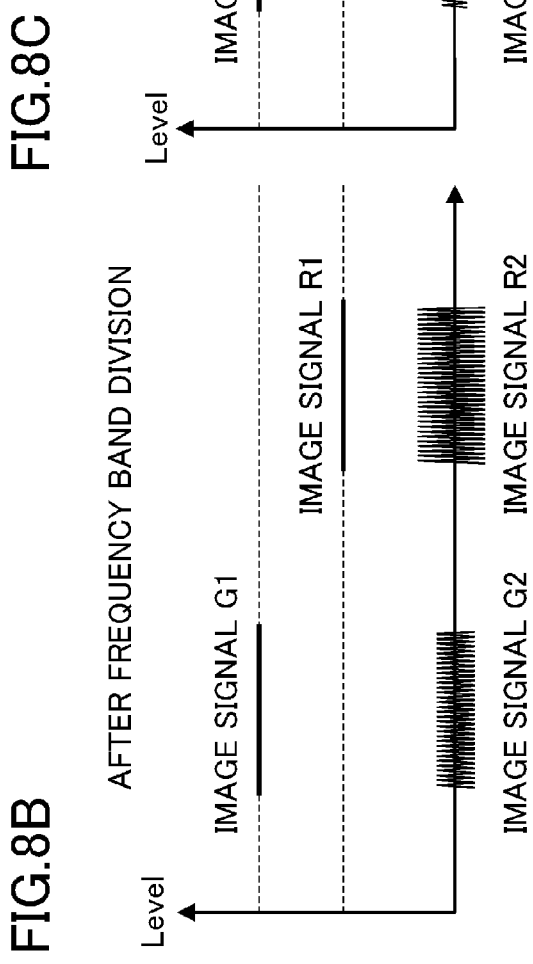

BEFORE FREQUENCY BAND DIVISION

AFTER FREQUENCY BAND RECONSTRUCTION

AFTER FREQUENCY BAND DIVISION

AFTER NOISE REDUCTION

FIG.24

| n(1) | n(2) | n(3) |
|------|------|------|
| n(4) | p    | n(5) |
| n(6) | n(7) | n(8) | p : PROCESS TARGET PIXEL
n(x) : ADJACENT PIXEL ( x=1,2,...,8 )

$p = \{\sum \phi(x)\}/8 \ (x=1,2,...,8)$
WHERE
$\quad \phi(x) = p \ (\text{Where } |p-n(x)| > th)$
$\qquad\quad = n(x) \ (\text{Where } |p-n(x)| \leq th)$

FIG.25

| n(1) | n(2) | n(3) |
|------|------|------|
| n(4) | A B p | n(5) |
| n(6) | n(7) | n(8) |

$p = [n(2)+n(3)+n(5)+5p]/8$
(n(1), n(4), n(6), n(7), n(8) are replaced with p)

p(n) : PROCESS TARGET PIXEL
p(n-1) : PIXEL OF FIRST PRECEDING FRAME FROM CURRENT FRAME
p(n-2) : PIXEL OF SECOND PRECEDING FRAME FROM CURRENT FRAME $p(n) = (1-k) \cdot p(n) + k \cdot p(n-1)$

NOISE REDUCTION DEVICE AND NOISE REDUCTION METHOD

CROSS-REFERENCE TO RELATED APPLICATION

This application claims priority to Japanese Patent Application No. 2012-055574 filed on Mar. 13, 2012 and Japanese Patent Application No. 2012-164564 filed on Jul. 25, 2012, the disclosure of which including the specifications, the drawings, and the claims is hereby incorporated by reference in its entirety.

BACKGROUND

The present disclosure relates to techniques to reduce noise included in image signals.

Japanese Patent Publication No. 2000-106630 discloses a technique to reduce noise included in image signals by using two-dimensional digital noise reduction (DNR). According to this technique, whether or not there is a correlation between a target pixel whose noise will be reduced and each of pixels adjacent to the target pixel is determined, and pixel values of the adjacent pixels determined to be correlated with the target pixel are added up and averaged, thereby obtaining a pixel value. Then, the target pixel is replaced with a pixel corresponding to the obtained pixel value. Thus, the larger the number of adjacent pixels determined to be correlated with the target pixel is, the more noise reduction effect can be enhanced.

SUMMARY

The present disclosure provides a noise reduction device capable of more effectively reducing noise included in image signals.

The noise reduction device of the present disclosure includes a noise reduction section configured to reduce noise included in an image signal. The noise reduction section includes: a first correlation detector configured to receive, as the image signal, a first image signal and a second image signal obtained from an identical image, detect correlations between corresponding pixels between the first image signal and the second image signal, and output, based on the detected correlations, first degrees of correlation between the corresponding pixels; a first addition ratio determining section configured to determine, based on the first degrees of correlation, first addition ratios based on which the corresponding pixels are added up in a first weighted addition averaging process; and a first weighted addition averaging section configured to perform, at the first addition ratios, the first weighted addition averaging process on the corresponding pixels to generate a first output image signal from the first image signal and the second image signal, and output the first output image signal instead of the first image signal, wherein when each of the first degrees of correlation is relatively high, the first addition ratio determining section provides a relatively high proportion referring to the pixel of the second image signal in first addition ratio.

The noise reduction device according to the present disclosure is useful to more effectively reduce noise included in image signals.

BRIEF DESCRIPTION OF THE DRAWINGS

FIGS. 4A-4B are views illustrating how noise is reduced according to the first embodiment.

FIGS. 8A-8D are views illustrating how noise is reduced according to the second embodiment.

FIG. 24 is a view illustrating a noise reduction process by two-dimensional DNR.

FIG. 25 is a view illustrating one of problems caused in the noise reduction process by the two-dimensional DNR.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

The inventor provides the following description and the attached drawings to enable those skilled in the art to fully understand the present disclosure. Thus, the description and the drawings are not intended to limit the scope of the subject matter defined in the claims.

First Embodiment

A first embodiment will be described below with reference to FIGS. 1-4.

[1-1. Entire Configuration of Noise Reduction Device]

Figure 1:
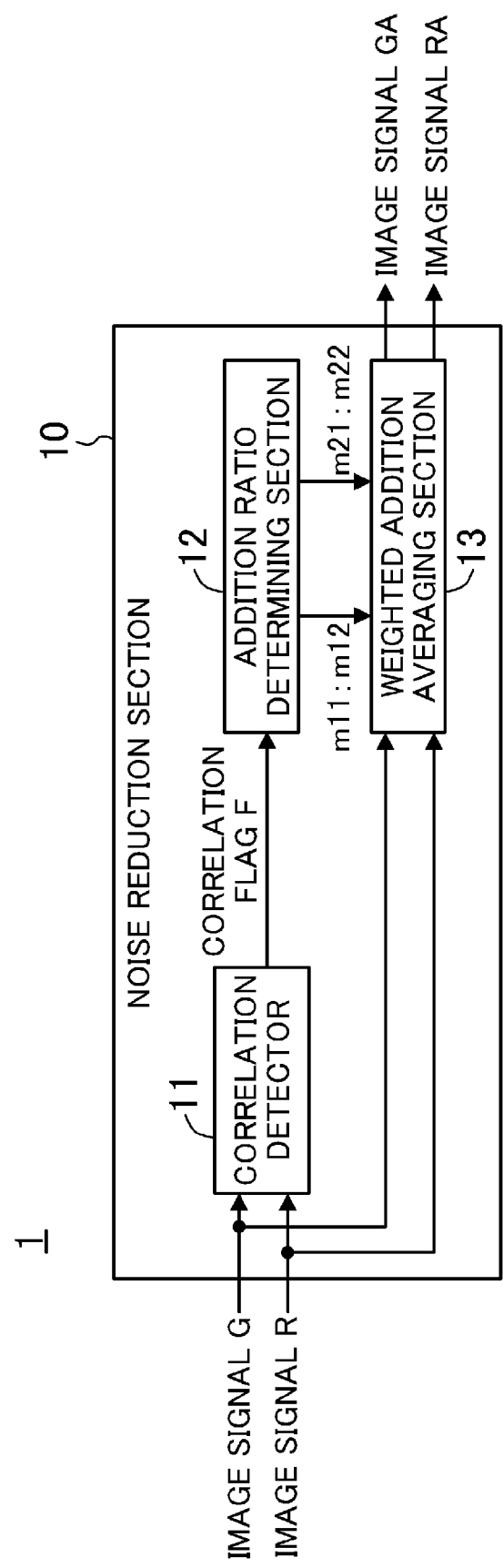
FIG. 1 is a block diagram illustrating an example configuration of a noise reduction device according to a first embodiment.

FIG. 1 is a block diagram illustrating an example configuration of a noise reduction device according to the first embodiment. A noise reduction device 1 of FIG. 1 includes a noise reduction section 10 configured to reduce random noise (hereinafter simply referred to as noise) included in two input image signals, and to output two output image signals. The two input image signals are color signals obtained from an identical image, and are, for example, two image signals of RGB signals.

The noise reduction section 10 includes a first correlation detector 11, a first addition ratio determining section 12, and a first weighted addition averaging section 13.

[1-1-1. Configuration of Correlation Detector]

Of RGB signals obtained from an identical image, for example, a green (G) signal as a first image signal (hereinafter referred to as an image signal G) and a red (R) signal as a second image signal (hereinafter referred to as an image signal R) are input to the correlation detector 11. Note that in the present embodiment, the G signal and the R signal are used, but any two of the RGB signals may be used. The correlation detector 11 detects correlations between corresponding pixels between the image signal G and the image signal R, and obtains, based on the correlations, degrees of correlation between the pixels (first degrees of correlation). The correlation detector 11 outputs, for example, 2-bit correlation flags F each of which represents the degree of correlation.

Figure 2:
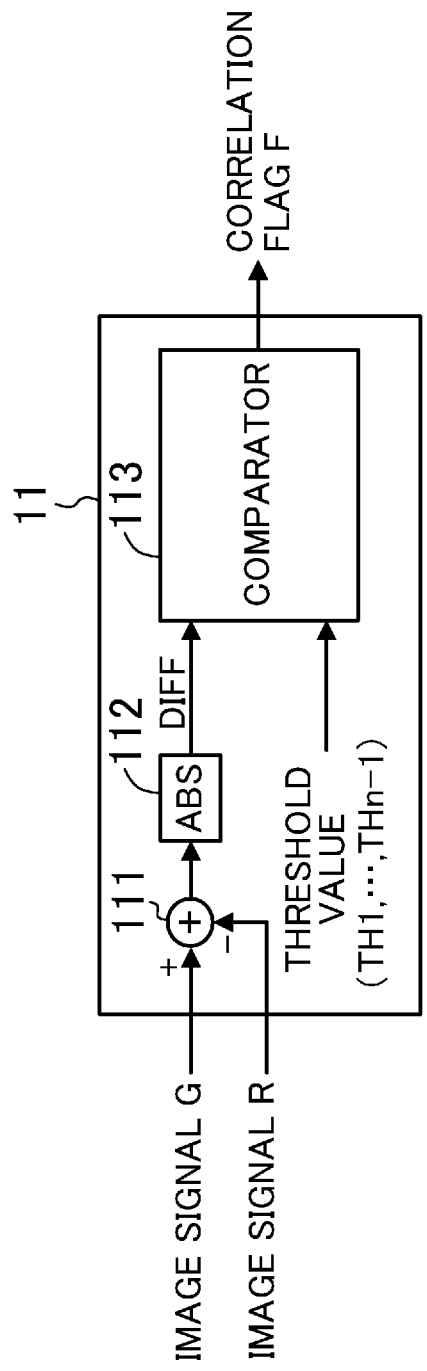
FIG. 2 is a block diagram illustrating an example configuration of a correlation detector according to the first embodiment.

FIG. 2 is a block diagram illustrating an example configuration of the correlation detector according to the present embodiment. The correlation detector 11 includes, for example, a subtracter 111, an absolute value calculator 112, and a comparator 113.

The subtracter 111 computes difference values between the corresponding pixels between the image signal G and the image signal R. The absolute value calculator 112 computes an absolute value DIFF of each difference value computed by the subtracter 111. The comparator 113 compares the absolute value DIFF with a predetermined threshold value, and outputs a correlation flag F as a result of the comparison.

When the correlation detector 11 evaluates the degrees of correlation on, for example, a four-level scale, threshold values TH1-TH3 are used as predetermined threshold values. Here, the threshold values TH1-TH3 have the following relationship: TH3<TH2<TH1. The comparator 113 compares the threshold values TH1-TH3 with the absolute value DIFF, and outputs a correlation flag F having a value corresponding to a result of the comparison.

Specifically, the correlation flag F=3 when DIFF<TH3, the correlation flag F=2 when TH3≤DIFF<TH2, the correlation flag F=1 when TH2≤DIFF<TH1, and the correlation flag F=0 when TH1≤DIFF. That is, when the correlation flag F=3, this indicates that the correlation between a pixel of the image signal G and a pixel of the image signal R corresponding to the pixel of the image signal G is maximum, and when the correlation flag F=0, this indicates that the correlation is minimum. In the present embodiment, in order to evaluate the degrees of correlation on the four-level scale, each correlation flag F is represented by 2 bits, which takes on values from 0 to 3. However, the degrees of correlation may be evaluated on an n-level scale (where n is an integer greater than or equal to 2), and in this case, the number of bits of each correlation flag F may be set based on n.

[1-1-2. Description of Addition Ratio Determining Section]

Referring back to FIG. 1, the addition ratio determining section 12 determines addition ratios of the corresponding pixels between the image signal G and the image signal R, where the addition ratios are used in weighted addition averaging processes performed by the weighted addition averaging section 13. Note that as described later, in the present embodiment, in order to generate an image signal GA serving as the first output image signal by using the image signals G and R, first weighted addition averaging processes are performed based on the first addition ratios, and in order to generate an image signal RA serving as the second output image signal by using the image signals G and R, second weighted addition averaging processes are performed based on second addition ratios.

Based on the values of the correlation flags F, the addition ratio determining section 12 determines the first and second addition ratios of the pixels between which correlations have been detected. For example, the addition ratio determining section 12 includes a table in which the correlation flag F, the first addition ratio, and the second addition ratio are associated with each other. The table is set such that when the value of the correlation flag F is relatively high, for example, when a state of the correlation is changed from a minimum state to a state between the minimum state and a maximum state, a relatively high proportion of a pixel of the image signal R in the first addition ratio is provided, and a relatively high proportion of a pixel of the image signal G in the second addition ratio is provided.

Here, each first addition ratio can be expressed as m11:m12 (where m11+m12=1), where m11 refers to the proportion of a pixel of the image signal G, and m12 refers to the proportion of a pixel of the image signal R which are added up in the first weighted addition averaging process. Moreover, each second addition ratio can be expressed as m21:m22 (where m21+m22=1), where m21 refers to the proportion of a pixel of the image signal G, and m22 refers to the proportion of a pixel of the image signal R which are added up in the second weighted addition averaging process.

Thus, for example, when the correlation flag F=0 (the correlation is minimum), the addition ratio determining section 12 outputs m11=1, m12=0, and m21=0, m22=1. When the correlation flag F=1, m11=⅞, m12=⅛, and m21=⅛, m22=⅞ are output. That is, when the value of the correlation flag F is relatively high, relatively high values of m12 and m21 are provided. When the correlation flag F=2, m11=¾, m12=¼, and m21=¼, m22=¾ are output. When the correlation flag F=3 (the correlation is maximum), m11=½, m12=½, and m21=½, m22=½ are output. As described above, when the correlation flag F represents that the correlation is minimum, the addition ratio determining section 12 may set m11 and m22 to maximum values, whereas as the value of the correlation flag F increases, the addition ratio determining section 12 may reduce m11 and increase m12 so that m11 equals m12, and may increase m21 and reduce m22 so that m21 equals m22.

[1-1-3. Configuration of Weighted-Addition-Averaging Section]

Figure 3:
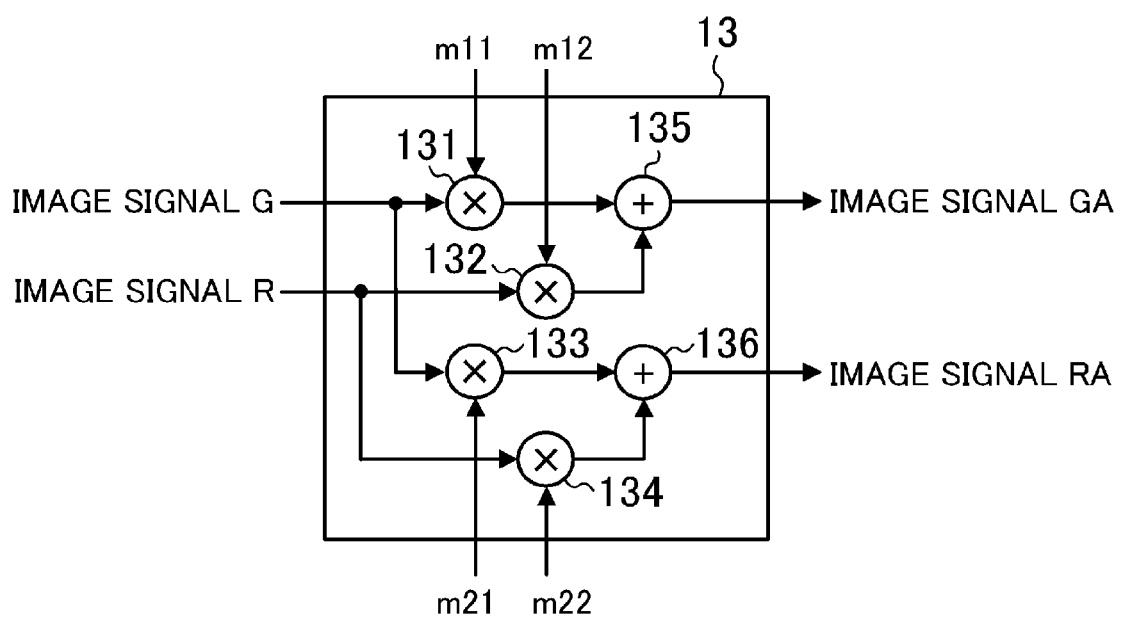
FIG. 3 is a block diagram illustrating an example configuration of a weighted addition averaging section according to the first embodiment.

FIG. 3 is a block diagram illustrating an example configuration of a weighted addition averaging section according to the present embodiment. The weighted addition averaging section 13 includes multipliers 131, 132 and an adder 135 which are configured to perform the first weighted addition averaging processes based on the first addition ratios, and multipliers 133, 134 and an adder 136 which are configured to perform the second weighted addition averaging processes based on the second addition ratios. By these components, a noise reduction process to reduce noise included in image signals is performed in the weighted addition averaging section 13.

Specifically, the multiplier 131 receives m11 and a pixel of the image signal G, and the multiplier 132 receives m12 and a pixel of the image signal R corresponding to the pixel of the image signal G. Each of results of operations by the multipliers 131, 132 is input to the adder 135, and the image signal GA is output as a result of the first weighted addition averaging processes. Note that the image signal GA is a green (G) signal obtained by reducing noise included in the image signal G in the first weighted addition averaging processes.

The multiplier 133 receives m21 and a pixel of the image signal G, and the multiplier 134 receives m22 and a pixel of the image signal R corresponding to the pixel of the image signal G. Each of results of operations of the multipliers 133, 134 is input to the adder 136, and the image signal RA is output as a result of the second weighted addition averaging processes. Note that the image signal RA is a red (R) signal obtained by reducing noise included in the image signal R in the second weighted addition averaging processes.

[1-2. Outline of Operation of Noise Reduction Device]

In the noise reduction device 1 according to the present embodiment, the first and second weighted addition averaging processes are performed on the corresponding pixels between the image signal G and the image signal R based on the first and second addition ratios based on the values of the correlation flags F. Noise included in the image signal G and the image signal R are reduced to output the image signal GA and the image signal RA.

FIGS. 4A, 4B are views illustrating how noise is reduced according to the present embodiment. FIGS. 4A, 4B show waveform images of image signals of a G channel and an R channel displayed on a waveform monitor. FIG. 4A shows the waveform images of the image signal G and the image signal R before noise reduction. FIG. 4B shows waveform images after the noise reduction in the case where the degrees of correlation between the corresponding pixels between the image signal G and the image signal R are maximum. Note that the vertical axis in FIG. 4 indicates signal levels, for example, the luminance of the image signal G and the image signal R.

When each degree of correlation between the corresponding pixels between the image signal G and the image signal R is maximum, the noise reduction process is performed with m11 being equal to m12 and m21 being equal to m22. In this case, it can be seen from FIG. 4B that the image signal GA and the image signal RA are obtained which are the image signal G and the image signal R from which noise has been effectively reduced.

[1-3. Advantages, Etc.]

Prior to description of operation and advantages of the present embodiment, two-dimensional digital noise reduction (DNR), which is one of techniques to reduce noise included in image signals, will be described with reference to FIG. 24.

FIG. 24 is a view illustrating an image of a two-dimensional image, which corresponds to FIG. 1 of Japanese Patent Publication No. 2000-106630. Here, a target pixel on which a noise reduction process will be performed is denoted by p, and pixels adjacent to the target pixel are denoted by n(1), n(2), ..., n(8).

In the two-dimensional DNR, first, an absolute value of a pixel difference value between the target pixel p and each of the adjacent pixels n(1), n(2), ..., n(8) is computed.

When an adjacent pixel has an absolute value which is higher than a threshold value th, that is, when $|p-n(x)|>th$ (x=1, 2, ..., 8), the adjacent pixel is determined to be uncorrelated with the pixel p. In this case, the adjacent pixel is replaced with the pixel p.

In contrast, an adjacent pixel has an absolute value which is lower than or equal to the threshold value th, that is, when $|p-n(x)|\le th$ (x=1, 2, ..., 8), the adjacent pixel is determined to be correlated with the pixel p. In this case, the adjacent pixel is left without being processed.

After that, eight pixels, the pixels n(1), n(2), ..., n(8), are added up and averaged, thereby obtaining a pixel, and the pixel p is replaced with the obtained pixel. The above-described process is performed on all pixels in the image.

Thus, the larger the number of adjacent pixels which have been determined to be correlated with the target pixel is, the higher the degree of the noise reduction effect is.

As described above, in the two-dimensional DNR disclosed in Japanese Patent Publication No. 2000-106630, when the threshold value th with reference to which the correlation is determined is increased, it is possible to perform the addition-averaging process using increased number of adjacent pixels, and thus the noise reduction effect can be enhanced. However, when a large number of adjacent pixels are used in the addition-averaging process, two-dimensional lowpass filter effect occurs, so that high-frequency components included in the image signals are lost, which may blur the contour of a subject of an image and degrade the spatial resolution.

Moreover, in some cases in the two-dimensional DNR described above, adjacent pixels on which the addition-averaging process will be performed to generate a pixel with reduced noise are not symmetrically located in each of the vertical, horizontal, and oblique directions in an image. When the adjacent pixels are asymmetrically located relative to the target pixel, the target pixel is replaced with a pixel whose center of gravity is located in a different position from that of the target pixel due to the noise reduction process.

This will be described with reference to FIG. 25. FIG. 25 shows the case where a pixel p correlates with each of pixels n(2), n(3), and n(5). In FIG. 25, the pixels n(2), n(3), and n(5) are located on an upper right side of the pixel p. That is, the pixels n(2), n(3), and n(5) are asymmetrically located relative to the pixel p.

In this case, the center of gravity of the pixel p before the noise reduction process is point A, whereas the center of gravity of the pixel p after the noise reduction process is point B.

As described above, if a spatial position of the center of gravity differs depending on subjects, or a temporal position of the center of gravity moves according to movement of a subject, when the noise reduction process is performed, in particular, on a moving image, the movement of the subject may not smooth. For example, when a subject having a vertically striped pattern is captured while moving a camera in the horizontal direction, an image in which intervals between stripe lines vary to move in the horizontal direction may be obtained.

Figure 26:
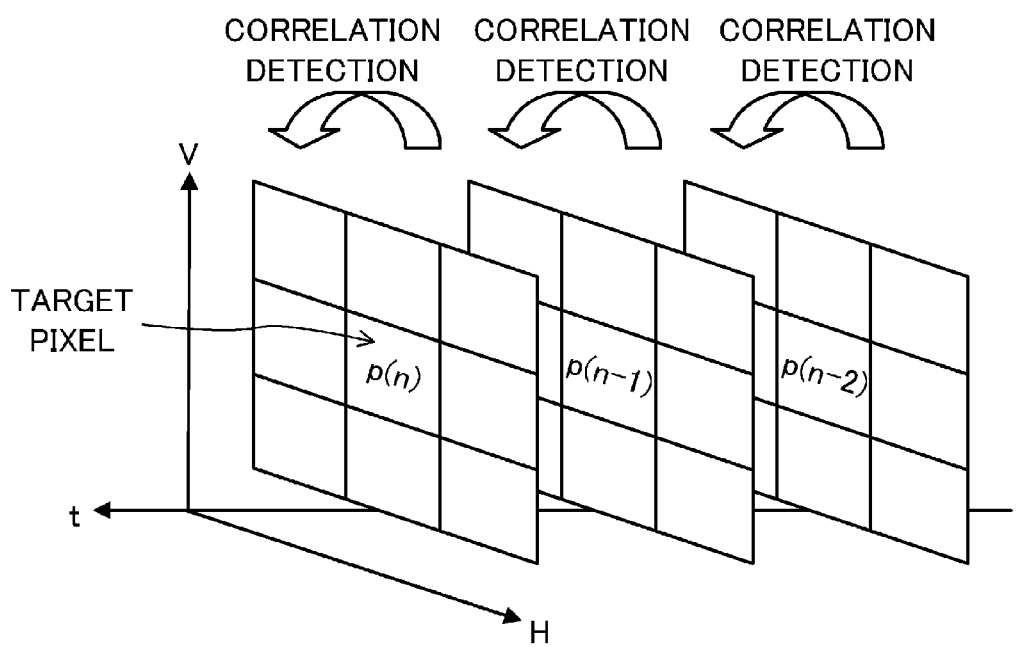
FIG. 26 is a view illustrating a noise reduction process by three-dimensional DNR.

Next, three-dimensional DNR will be described with reference to FIG. 26. FIG. 26 is a view illustrating a noise reduction process by the three-dimensional DNR.

In FIG. 26, images of a plurality of two-dimensional frames are aligned in a direction of a time axis.

Note that reference symbol H denotes the horizontal direction, reference symbol V denotes the vertical direction, and reference symbol t denotes a time (frame) direction. Reference symbol p(n) denotes a target pixel on which a process will be performed and which is located in an image of a current frame. Reference symbol p(n−1) denotes a pixel located in an image of a first preceding frame from the current frame and in the same position as the pixel p(n). Reference symbol p(n−2) denotes a pixel located in an image of a second preceding frame from the current frame and in the same position as the pixel p(n).

In the three-dimensional DNR, first, an absolute value of a difference value between the pixel p(n) and the pixel p(n−1) is obtained. Based on the magnitude of the absolute value, comparison of the absolute value with a predetermined threshold value, or the like, the degree of correlation between the pixel p(n) and the pixel p(n−1) is determined. The pixel p(n) and the pixel p(n−1) are subjected to the weighted addition averaging process by using the expression: $(1−k) \times p(n) + k \times p(n−1)$ ($0 \le k \le 1$), where k is a variable number determined based on the degree of correlation.

The pixel p(n) is replaced with a pixel obtained in the weighted addition averaging process. These processes are repeatedly performed on the frames.

In the weighted addition averaging process, when the degree of correlation between the target pixel and the pixel of the first preceding frame from the current frame is higher, the variable number k is set to a higher value, so that the noise reduction effect can be enhanced. However, setting the variable number k to a higher value makes the moving image more like a still image, which may cause image lags in the image which initially involves motion. That is, the dynamic resolution of moving images is degraded.

Moreover, in the three-dimensional DNR, the noise reduction effect can be significantly enhanced by setting the variable number k to a high value in the case of still images. However, in the case of motion images, it becomes difficult to reduce image lags when the noise reduction effect is enhanced by setting the variable number k to a high value. In contrast, in the case of the motion images, image lags can be reduced by setting the variable number k to a low value, but, for example, when a subject is captured while a camera is moved and halted alternately, noise drastically increases at a moment at which the camera in a halted state is moved, which may result in an unnatural video image.

In contrast, in the noise reduction device 1 according to the present embodiment, the image signal G and the image signal R which are obtained from an identical image are subjected to the noise reduction process such that m11 and m21 equal m12 and m22, respectively, when each degree of correlation between the corresponding pixels between the image signal G and the image signal R increases. This can effectively reduce noise included in the image signal G and the image signal R. Thus, it is possible to reduce noise included in an image configured by combining the image signal GA and the image signal RA after the noise reduction. Therefore, the noise reduction process by the noise reduction device 1 according to the present embodiment differs from the above-described two-dimensional DNR, and from the above-described three-dimensional DNR.

As described above, the noise reduction device 1 according to the present embodiment is less likely to cause the problems, which arise in the case of using the two-dimensional DNR or the three-dimensional DNR. That is, before and after reducing noise in image signals, the sharpness of the contour of a subject can be maintained. Moreover, even in the case of moving images, image lags can be reduced, so that the dynamic resolution is less likely to be degraded. Furthermore, in each of pixels of the image signals before and after the noise reduction process, a spatial and temporal position of the center of gravity can be maintained.

—Variation—

[1-4. Description of Correlation Detector]

In the present variation, the correlation detector 11 of the noise reduction device 1 of FIG. 1 adjusts the threshold values TH1-TH3 based on the signal level of an image signal obtained by adding up and averaging the corresponding pixels between the image signal G and the image signal R.

For example, when the signal level is higher than or equal to a predetermined level, the correlation detector 11 uses the threshold values TH1-TH3 without being adjusted to compute the value of the correlation flag F. In contrast, when the signal level is lower than the predetermined level, the correlation detector 11 multiplies the threshold values TH1-TH3 by, for example, 2, and compares the multiplied threshold values TH1-TH3 with each absolute value DIFF to compute the value of the correlation flag F. Thus, when the signal level is lower than the predetermined level, the correlation detector 11 obtains a high degree of correlation. As a result, the noise reduction effect can be enhanced.

[1-5. Advantages, Etc.]

When the signal level of an image signal is low, that is, when the luminance of an image signal is low, the image signal is almost achromatic, but there are some cases where the proportion of noise in the image signal is relatively dominant. Therefore, even when the image signal is a signal representing an initially black subject such as a blackout curtain, unnatural coloring may occur due to the influence of noise.

Thus, as in the present variation, when a high degree of correlation is obtained in the case of a low signal level, the noise reduction effect is enhanced, and thus it is possible to reduce the unnatural coloring occurring in the blackout curtain, etc. That is, the image signal can be maintained in an initial state in which the image signal is almost achromatic.

Note that in the present variation, when the signal level is lower than the predetermined level, the threshold values TH1-TH3 may be multiplied by α (where α is a positive real number), and the multiplied threshold values TH1-TH3 may be compared with the absolute value DIFF. Alternatively, different threshold values may be used between the case of the high signal level and the case of the low signal level. For example, when the signal level is higher than or equal to the predetermined level, the threshold values TH1-TH3 are used, and when the signal level is lower than the predetermined level, for example, threshold values TH1'-TH3' which are set independently from the threshold values TH1-TH3 may be used.

In the present variation, the signal level is compared with one predetermined level to evaluate the signal level on a two-level scale. However, the signal level may be compared with a plurality of predetermined levels to evaluate the signal level on a three- or more-level scale. In this case, the threshold values TH1-TH3 may be changed in a step-by-step manner by multiplying by, for example, 2 and 3 so that the degree of correlation increases as the signal level lowers. Thus, it is possible to obtain a suitable noise reduction effect according to the signal level.

Second Embodiment

A second embodiment will be described below with reference to FIGS. 5-8.

[2-1. Entire Configuration of Noise Reduction Device]

Figure 5:
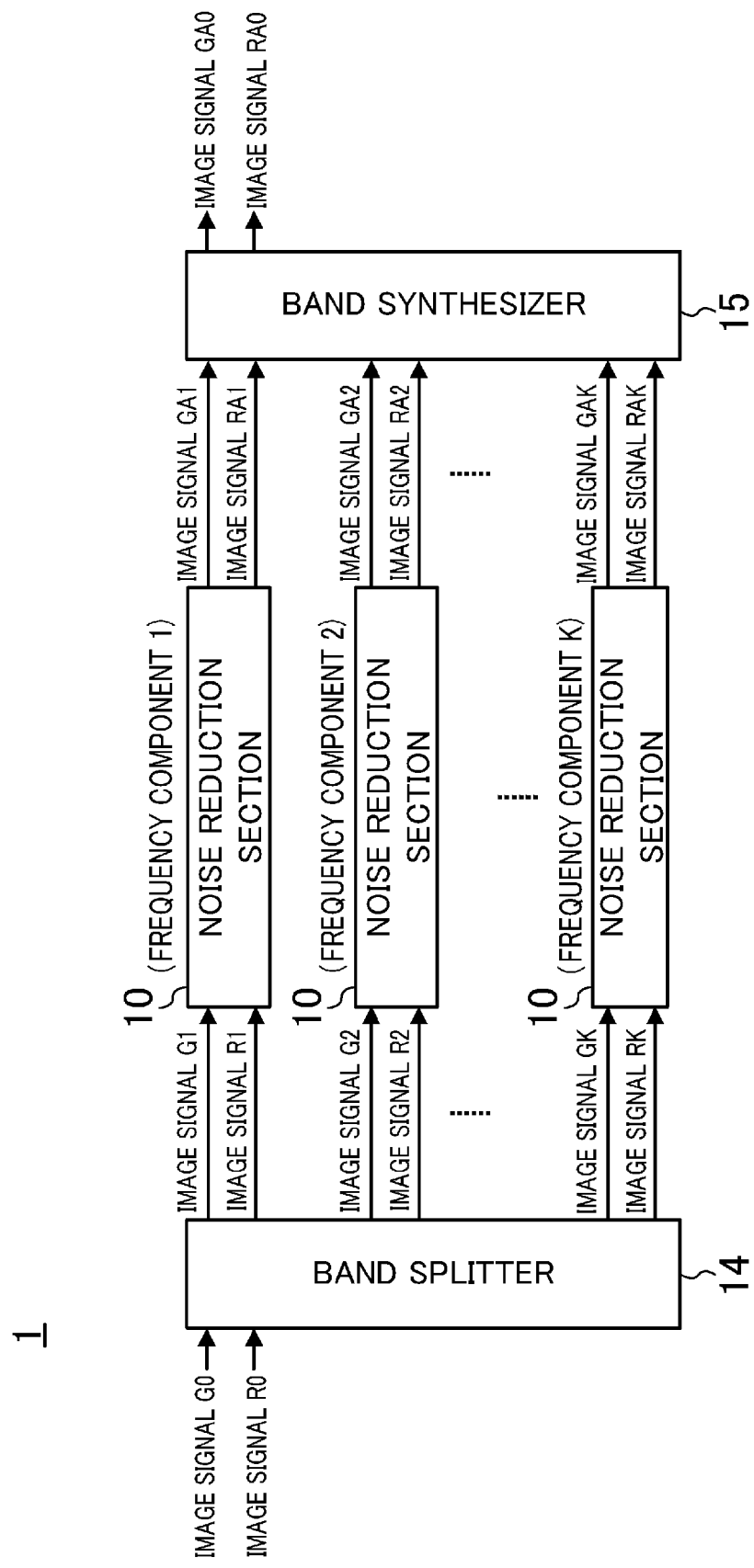
FIG. 5 is a block diagram illustrating an example configuration of a noise reduction device according to a second embodiment.

FIG. 5 is a block diagram illustrating an example configuration of a noise reduction device according to the second embodiment. The noise reduction device 1 includes a band splitter 14, the noise reduction section 10 of FIG. 1 including K noise reduction sections (where K is an integer greater than or equal to 2), and a band synthesizer 15.

Of RGB signals obtained from an identical image, for example, a green (G) signal (hereinafter referred to as an image signal G0) and a red (R) signal (hereinafter referred to as image signal R0) are input to the band splitter 14. The band splitter 14 splits each of the image signal G0 and the image signal R0 into frequency components 1-K. In FIG. 5, image signals G1-GK are signals obtained by splitting the image signal G0 into K types of frequency components, and are first image signals each input to a corresponding one of the noise reduction sections 10. Image signals R1-RK are signals obtained by splitting the image signal R0 into K types of frequency components, and are second image signals each input to a corresponding one of the noise reduction sections 10. One of the image signals G1-GK and one of the image signals R1-RK which have the same frequency are organized into each of K groups, and the band splitter 14 outputs each of the K groups to a different one of the noise reduction sections 10.

As to the image signals G1-GK and the image signals R1-RK, the same end digits indicate that the image signals have the same frequency. For example, since the image signal G1 and the image signal R1 have the same frequency, the image signal G1 and the image signal R1 are organized into a group, which is input to a corresponding one of the noise reduction sections 10. The frequency components 1-K represent groups of image signals having the same frequency of the image signals G1-GK and the image signals R1-RK. Digits represented by 1-K correspond to the end digits of the image signals G1-GK and the image signals R1-RK. Moreover, as to the image signals G1-GK and the image signals R1-RK, the larger the end digit is, the higher the frequency is.

Each noise reduction section 10 receives a group of image signals corresponds thereto out of the image signals G1-GK and the image signals R1-RK, and performs the noise reduction process as described in the first embodiment. For example, the noise reduction section 10 to which the image signal G1 and the image signal R1 are input receives the image signal G1 and the image signal R1 as the image signal G and the image signal R in the first embodiment. The noise reduction section 10 reduces noise included in the image signal G1 and the image signal R1, and outputs an image signal GA1 serving as a first output image signal and an image signal RA1 serving as a second output image signal, which are respectively the image signal GA and the image signal RA of the first embodiment.

[2-1-1. Configuration of Band Splitter]

Figure 6:
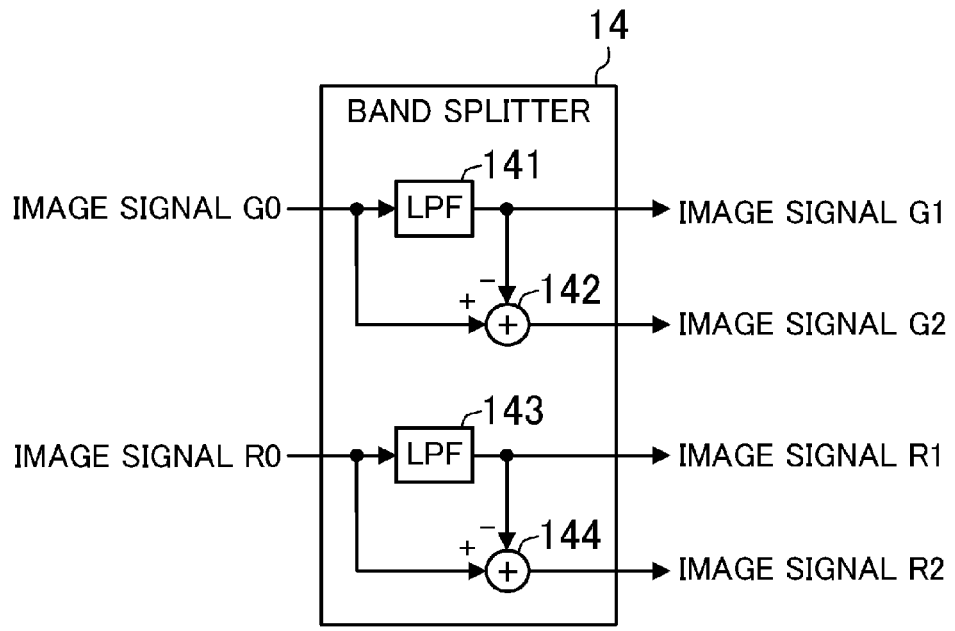
FIG. 6 is a block diagram illustrating an example configuration of a band splitter according to the second embodiment.

FIG. 6 is a block diagram illustrating an example configuration of the band splitter according to the present embodiment. The band splitter 14 illustrated in FIG. 6 is configured to split each of the image signal G0 and the image signal R0 into two frequency components.

The band splitter 14 includes, for example, lowpass filters 141, 143 and subtracters 142, 144.

The lowpass filter 141 receives the image signal G0, and outputs, of frequency components included in the image signal G0, the image signal G1 which is a low-frequency component (frequency component 1). The subtracter 142 subtracts the image signal G1 from the image signal G0 to generate the image signal G2 which is a high-frequency component (frequency component 2), and outputs the image signal G2.

The lowpass filter 143 receives the image signal R0, and outputs the image signal R1 which is a low-frequency component (frequency component 1). The subtracter 144 subtracts the image signal R1 from the image signal R0 to generate the image signal R2 which is a high-frequency component (frequency component 2), and outputs the image signal R2.

As described above, a group including the image signal G1 and the image signal R1, and a group including the image signal G2 and the image signal R2, which are two groups of image signals output from the band splitter 14, are each input to a different one of the noise reduction sections 10.

[2-1-2. Configuration of Band Synthesizer]

Figure 7:
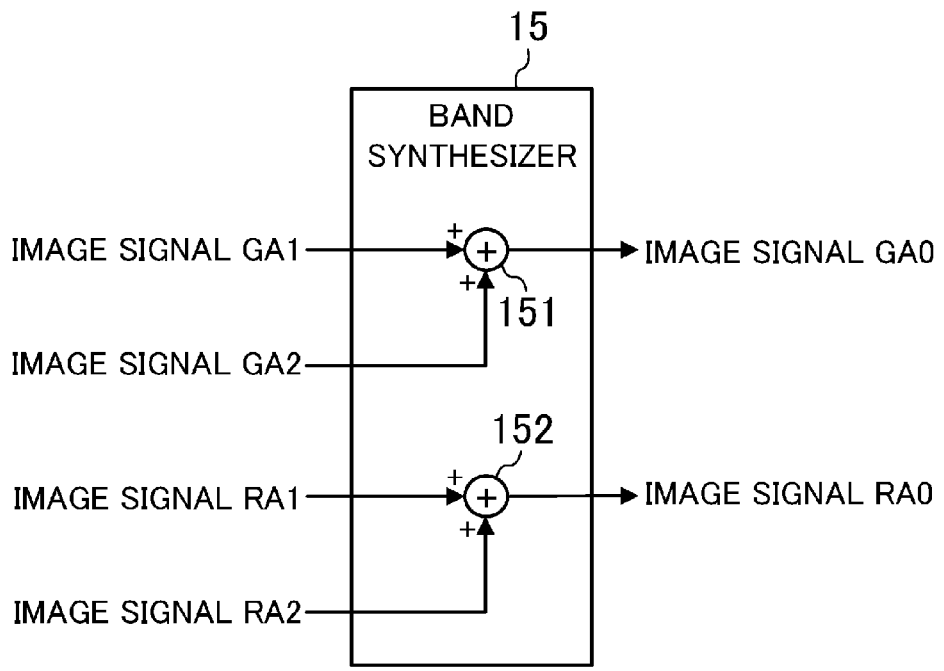
FIG. 7 is a block diagram illustrating an example configuration of a band synthesizer according to the second embodiment.

FIG. 7 is a block diagram illustrating an example configuration of the band synthesizer according to the present embodiment. The band synthesizer 15 illustrated in FIG. 7 is configured to perform band synthesis of the image signals GA1, GA2 and of the image signals RA1, RA2.

The band synthesizer 15 includes, for example, two adders 151, 152. The adder 151 adds up the image signals GA1, GA2 to generate an image signal GA0, and outputs the image signal GA0. The adder 152 adds up the image signals RA1, RA2 to generate an image signal RA0, and outputs the image signal RA0.

[2-2. Outline of Operation of Noise Reduction Device]

As described above, in the noise reduction device 1 according to the present embodiment, each of the image signal G0 and the image signal R0 is split into K types of frequency components, which are then subjected to the noise reduction process. The image signals GA1-GAK after the noise reduction are band-synthesized to generate the image signal GA0, and the image signals RA1-RAK after the noise reduction are band-synthesized to generate the image signal RA0.

FIGS. 8A-8D are views illustrating how noise is reduced in the present embodiment. FIGS. 8A-8D shows waveform images of image signals of a G channel and an R channel displayed on a waveform monitor. FIG. 8A shows waveform images of the image signal G0 and the image signal R0 input to the noise reduction device according to the present embodiment. FIG. 8B shows waveform images obtained after each of the image signal G0 and the image signal R0 is band-split into a low-frequency component and a high-frequency component. FIG. 8C shows waveform images obtained after noise in the image signals of FIG. 8B is reduced when the degrees of correlation are maximum. FIG. 8D shows waveform images obtained after the image signals GA1, GA2 are band-synthesized, and the image signals RA1, RA2 are band-synthesized.

As illustrated in FIGS. 8A-8D, it can be seen that when the noise reduction process is performed on every frequency component of the image signals G1, G2 and the image signals R1, R2, in particular, noise included in the image signal G2 and the image signal R2 which are high-frequency components is more effectively reduced.

[2-3. Advantages, Etc.]

As described above, according to the present embodiment, each of the image signal G0 and the image signal R0 is split into a plurality of frequency components, so that the noise reduction process can be performed on each group of image signals having the same frequency. That is, even when signal levels of the image signal G0 and the image signal R0 significantly differ from each other, the noise reduction process can be performed by using suitable first and second addition ratios on the groups of the image signals of each frequency component. Thus, for example, when the image signals which are low-frequency components have a low noise level, and the image signals which are high-frequency components have a high noise level, it is possible to enhance the noise reduction effect particularly on the image signals which are the high-frequency components.

The present embodiment has described the case where each of the image signal G0 and the image signal R0 is split into two frequency components, which are then synthesized. However, each of the image signal G0 and the image signal R0 may be split into three or more frequency components, which may then be synthesized.

Third Embodiment

A third embodiment will be described below with reference to FIG. 9.

[3-1. Entire Configuration of Noise Reduction Device]

Figure 9:
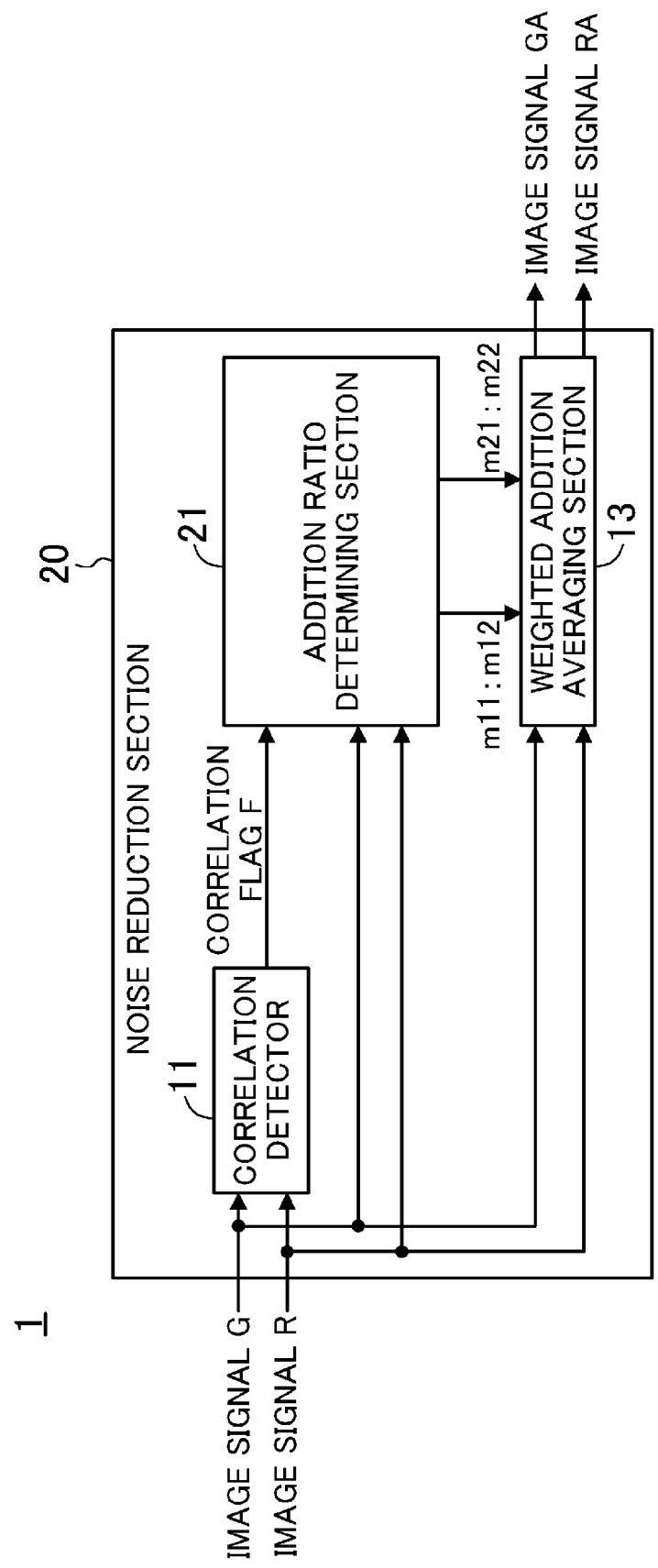
FIG. 9 is a block diagram illustrating an example configuration of a noise reduction device according to a third embodiment.

FIG. 9 is a block diagram illustrating an example configuration of a noise reduction device according to the third embodiment. A noise reduction section 20 illustrated in FIG. 9 includes a first correlation detector 11, a first addition ratio determining section 21, and a first weighted addition averaging section 13.

[3-2. Description of Addition Ratio Determining Section]

The addition ratio determining section 21 determines first and second addition ratios of corresponding pixels between an image signal G and an image signal R based on values of correlation flags F, where the first and second addition ratios are used in first and second weighted addition averaging processes performed by the weighted addition averaging section 13. Each first addition ratio is expressed as m11:m12 (where m11+m12=1), where m11 refers to the proportion of a pixel of the image signal G, and m12 refers to the proportion of a pixel of the image signal R which are added up in the first weighted addition averaging process. Each second addition ratio is expressed as m21:m22 (where m21+m22=1), where m21 refers to the proportion of a pixel of the image signal G, and m22 refers to the proportion of a pixel of the image signal R which are added up in the second weighted addition averaging process. The addition ratio determining section 21 receives the image signal G and the image signal R, and adjusts m11, m12, and m21, m22 based on signal levels of the image signal G and the image signal R.

For example, when the signal levels of the image signal G and the image signal R are lower than a predetermined level, the addition ratio determining section 21 adjusts the first addition ratio so that m11=m12, and the second addition ratio so that m21=m22, and outputs the adjusted first and second addition ratios. Moreover, when the signal levels of the image signal G and the image signal R are higher than or equal to the predetermined level, the addition ratio determining section 21 outputs the first and second addition ratios without being adjusted.

[3-3. Advantages, Etc.]

As described above, according to the present embodiment, even if the degrees of correlation decrease due to, for example, noise included in the image signal G and the image signal R, resulting in deviation of the first and second addition ratios from desired ratios, the first and second addition ratios can be corrected when the signal levels of both the image signal G and the signal level of the image signal R are low.

When the signal level of an image signal is low, that is, when the luminance of an image signal is low, the image signal is almost achromatic, but there are some cases where the proportion of noise in the image signal is relatively dominant. Therefore, even when the image signal is a signal representing an initially black subject such as a blackout curtain, unnatural coloring may occur due to the influence of noise.

Thus, as in the present embodiment, when an image signal has a low signal level, each first addition ratio is corrected so that m11=m12, and each second addition ratio is corrected so that m21=m22, so that the noise reduction effect is enhanced, and thus it is possible to reduce the unnatural coloring occurring in the blackout curtain, etc. That is, the image signal can be maintained in an initial state in which the image signal is almost achromatic.

In the present embodiment, the signal level is compared with one predetermined level to evaluate the signal level on a two-level scale. However, the signal level may be compared with a plurality of predetermined levels to evaluate the signal level on a three- or more-level scale. In this case, the first and second addition ratios may be changed in a step-by-step manner so that m11 and m21 equal m12 and m22, respectively, as the signal level decreases.

Although in the present embodiment, the signal levels of the image signal G and the image signal R are used as the signal level, a signal level of an image signal obtained by adding up and averaging the corresponding pixels between the image signal G and the image signal R may be used.

Fourth Embodiment

A fourth embodiment will be described below with reference to FIGS. 10 and 11.

[4-1. Entire Configuration of Noise Reduction Device]

Figure 10:
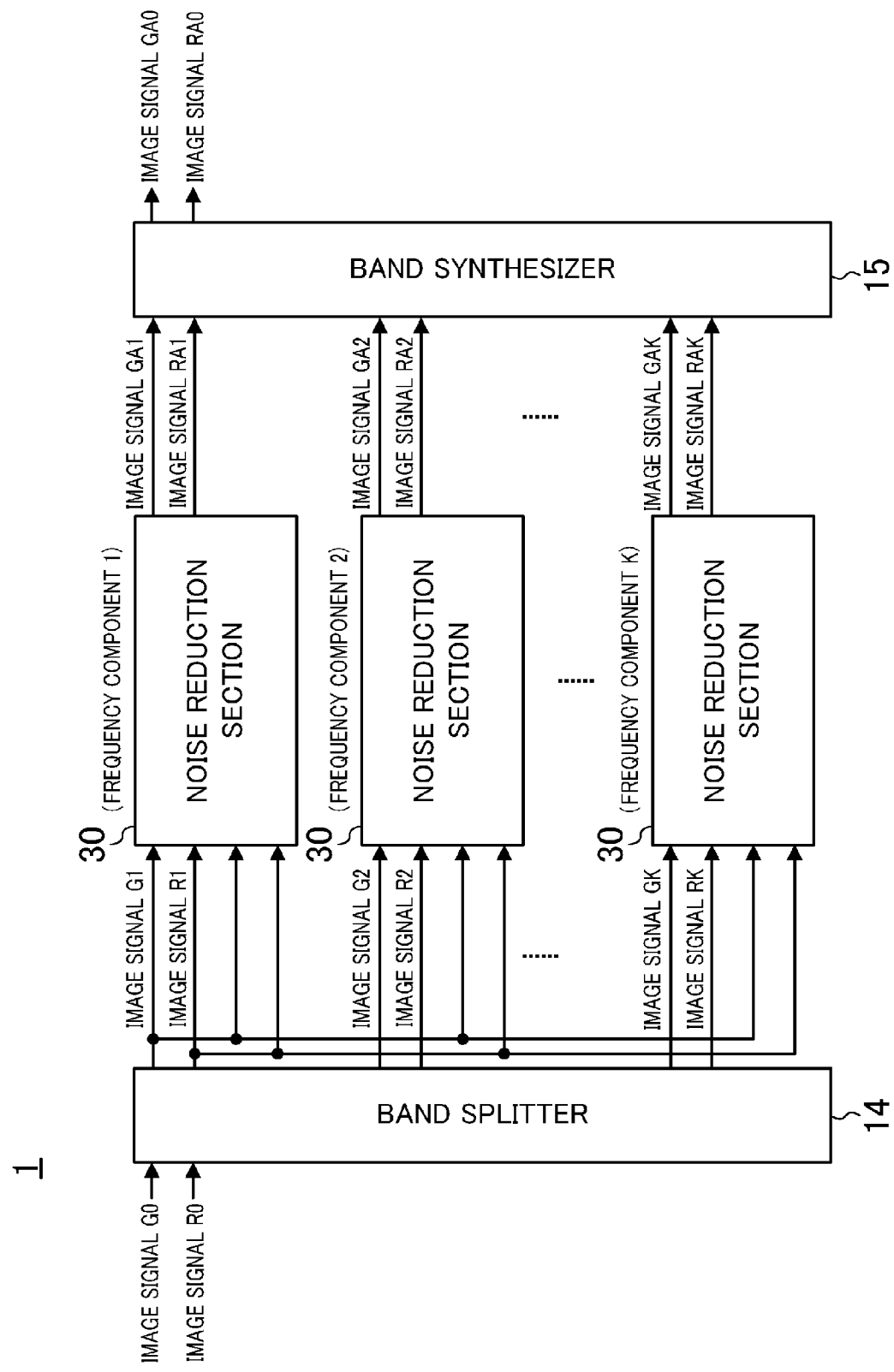
FIG. 10 is a block diagram illustrating an example configuration of a noise reduction device of a fourth embodiment.

FIG. 10 is a block diagram illustrating an example configuration of a noise reduction device according to the fourth embodiment. A noise reduction device 1 includes a band splitter 14, K noise reduction sections 30 (K is an integer greater than or equal to 2), which will be described later, and a band synthesizer 15.

Each K noise reduction section 30 receives a group of image signals corresponding thereto out of image signals G1-GK and image signals R1-RK. Moreover, of the image signals G1-GK and the image signals R1-RK, the image signal G1 and the image signal R1, which are a group of image signals each having the lowest frequency, that is, image signals of a frequency component 1 are commonly input to each noise reduction section 30. The image signals of the frequency component 1, which are low-frequency components, can be considered to represent DC levels of an image signal G0 and an image signal R0.

[4-1-1. Description of Noise Reduction Section]

Figure 11:
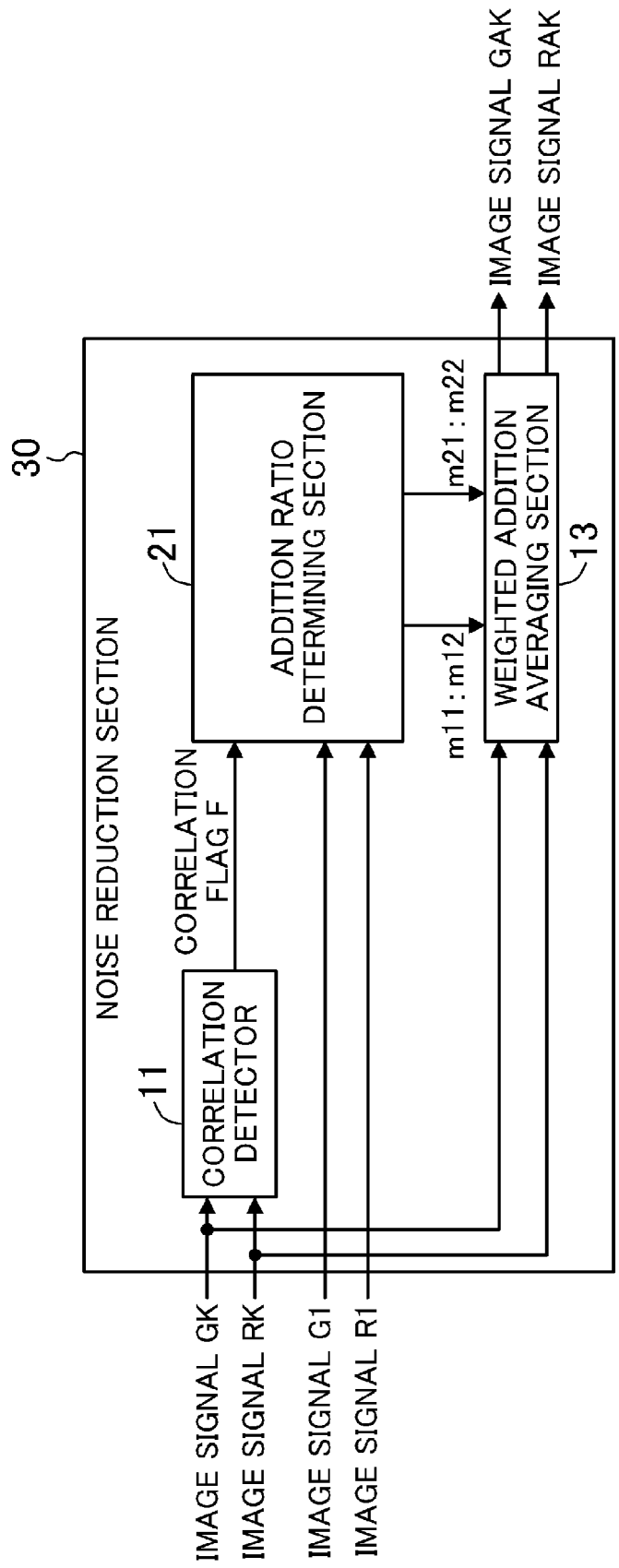
FIG. 11 is a block diagram illustrating an example of a noise reduction section according to the fourth embodiment.

FIG. 11 is a block diagram illustrating an example configuration of a noise reduction section according to the present embodiment. The noise reduction section 30 reduces noise included in the image signal GK and the image signal RK corresponding to the frequency component K of FIG. 10. The noise reduction section 30 includes a first correlation detector 11, a first addition ratio determining section 21, and a first weighted addition averaging section 13.

The correlation detector 11 detects correlations between corresponding pixels between the image signal GK and the image signal RK, and outputs correlation flags F representing degrees of correlation obtained based on the correlations.

The addition ratio determining section 21 determines first and second addition ratios based on values of the correlation flags F. Moreover, the addition ratio determining section 21 receives the image signal G1 and the image signal R1, and adjusts the first and second addition ratios based on signal levels of the image signal G1 and the image signal R1.

Specifically, when the signal levels of the image signal G1 and the image signal R1 are lower than a predetermined level, the addition ratio determining section 21 adjusts each first addition ratio so that m11=m12, and each second addition ratio so that m21=m22, and outputs the adjusted first and second addition ratios. When the signal levels of the image signal G1 and the image signal R1 are higher than or equal to the predetermined level, the addition ratio determining section 21 outputs the first and second addition ratios without being adjusted.

As described above, when the signal levels of the image signal G1 and the image signal R1 are lower than the predetermined level, each first addition ratio has the following relationship: m11=m12, and each second addition ratio has the following relationship: m21=m22, so that the noise reduction effect is enhanced.

[4-2. Advantages, Etc.]

As described above, in the present embodiment, the image signal G0 and the image signal R0 are split into a plurality of frequency components. Thus, even when the signal level of the image signal G0 significantly differs from the signal level of the image signal R0, the first and second addition ratios of the image signals of each frequency component can suitably be corrected according to the signal levels of the image signal G1 and the image signal R1. That is, even when the degrees of correlation decrease due to, for example, noise included in the image signals of each frequency component, resulting in deviation of the first and second addition ratios from desired ratios, the first and second addition ratios can be corrected to suitable ratios. As a result, noise included in the image signals of each frequency component can effectively be reduced.

In the present embodiment, the signal level is compared with one predetermined level to evaluate the signal level on a two-level scale. However, the signal level may be compared with a plurality of predetermined levels to evaluate the signal level on a three- or more-level scale. In this case, the first and second addition ratios may be changed in a step-by-step manner so that m11 and m21 equal m12 and m22, respectively, as the signal level decreases.

Although in the present embodiment, the signal levels of the image signal G1 and the image signal R1 are used as the signal level, a signal level of an image signal obtained by adding up and averaging the corresponding pixels between the image signal G1 and the image signal R1 may be used.

—Variation—

Figure 12:
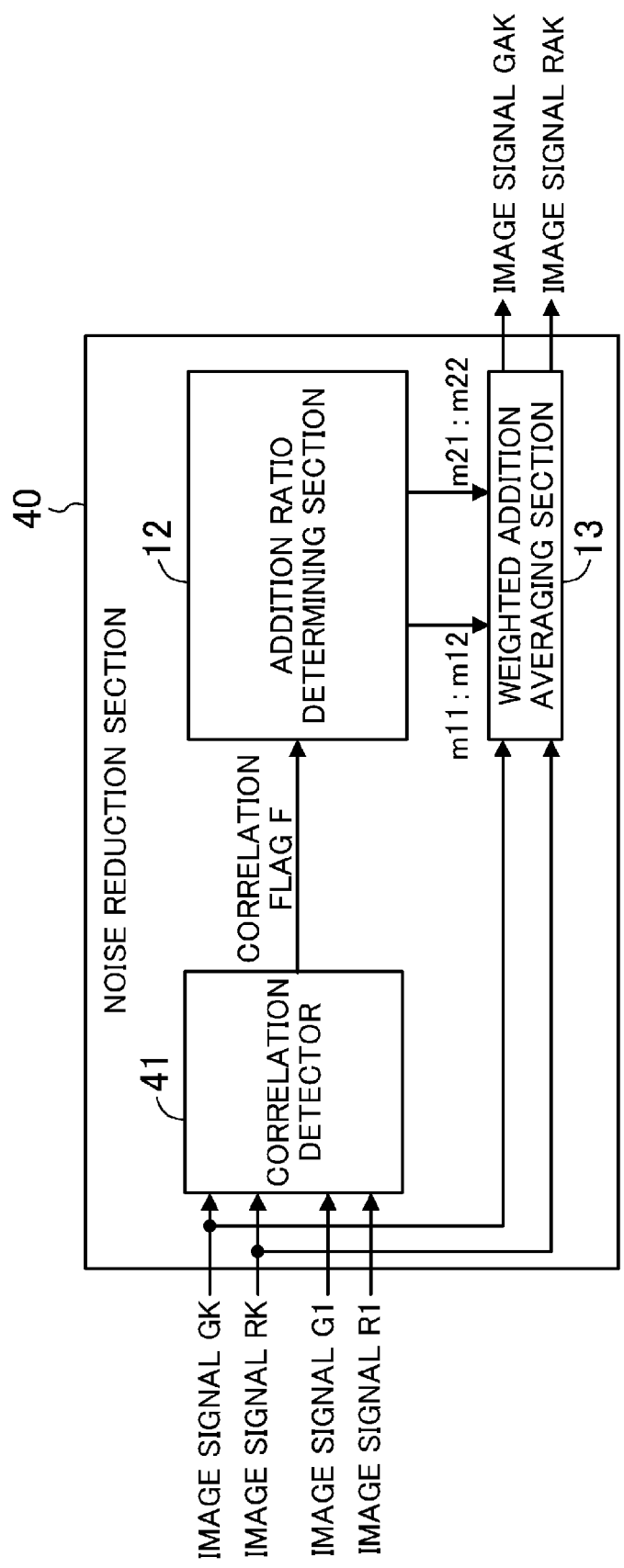
FIG. 12 is a block diagram illustrating a configuration of a noise reduction device according to a variation of the fourth embodiment.

A variation of the fourth embodiment will be described below with reference to FIG. 12. In the present variation, a noise reduction section 40 illustrated in FIG. 12 is used instead of the noise reduction section 30 of FIG. 10 and FIG. 11.

[4-3. Configuration of Noise Reduction Section]

The noise reduction section 40 includes a first correlation detector 41, a first addition ratio determining section 12, and a first weighted addition averaging section 13.

[4-3-1. Description of Correlation Detector]

The correlation detector 41 receives, for example, a group of an image signal GK and an image signal RK. Of groups of the image signals G1-GK and the image signals R1-RK, the image signal G1 and the image signal R1 which are a group of image signals each having the lowest frequency are also input to the correlation detector 41. The image signal G1 and the image signal R1 are image signals of low-frequency components, and thus can be considered to represent DC levels of the image signal G0 and the image signal R0.

The correlation detector 41 detects correlations between corresponding pixels between the image signal GK and the image signal RK, and obtains, based on the correlations, degrees of correlation. The correlation detector 41 outputs correlation flags F each of which represents the degree of correlation. Specifically, the correlation detector 41 compares each of absolute values DIFF of difference values between the corresponding pixels between the image signal GK and the image signal RK with threshold values TH1-TH3, and outputs a correlation flag F based on a result of the comparison. Moreover, the correlation detector 41 adjusts the threshold values TH1-TH3 according to the signal level of an image signal obtained by adding up and averaging the corresponding pixels between the image signal G1 and the image signal R1.

For example, when the signal level is higher than or equal to a predetermined level, the correlation detector 41 uses the threshold values TH1-TH3 without being adjusted to compute the value of the correlation flag F. In contrast, when the signal level is lower than the predetermined level, the correlation detector 41 multiplies the threshold values TH1-TH3 by, for example, 2, and compares the multiplied threshold values TH1-TH3 with each absolute value DIFF to compute the value of the correlation flag F. Thus, when the signal level is lower than the predetermined level, the correlation detector 41 obtains a high degree of correlation. As a result, the noise reduction effect can be enhanced.

[4-4. Advantages, Etc.]

As described above, according to the present variation, when the signal level of an image signal obtained by adding up and averaging the corresponding pixels between the image signal G1 and the image signal R1 which are low-frequency components is lower than the predetermined level, high degrees of correlation of the image signals of each frequency component can be obtained, so that it is possible to enhance the noise reduction effect of the noise reduction section 40.

Fifth Embodiment

A fifth embodiment will be described below with reference to FIGS. 13-15.

[5-1. Entire Configuration of Noise Reduction Device]

Figure 13:
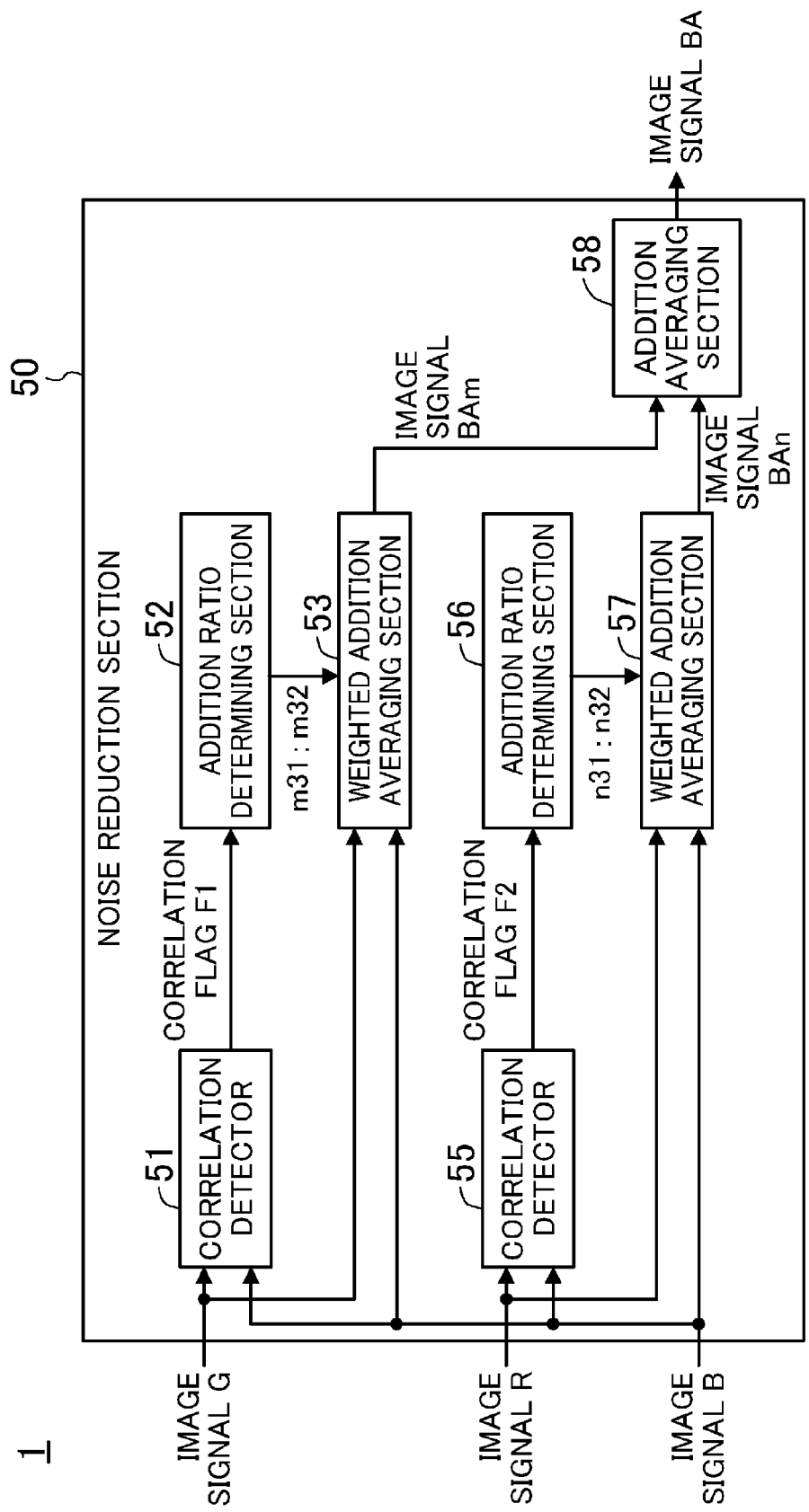
FIG. 13 is a block diagram illustrating an example configuration of a noise reduction device according to a fifth embodiment.

FIG. 13 is a block diagram illustrating an example configuration of a noise reduction device according to the fifth embodiment. A noise reduction device 1 allows a noise reduction section 50 to reduce noise included in one of three input image signals by using the other two image signals, and outputs one output image signal. The three input image signals are color signals obtained from an identical image, and are, for example, RGB signals. The noise reduction section 50 reduces noise included in, for example, a blue (B) signal serving as a first image signal (hereinafter referred to as an image signal B) by using an image signal G serving as a second image signal and an image signal R serving as a third image signal. Note that any image signal among the RGB signals may be subjected to noise reduction.

The noise reduction section 50 includes first and second correlation detectors 51, 55, first and second addition ratio determining sections 52, 56, first and second weighted addition averaging sections 53, 57, and an addition averaging section 58.

[5-1-1. Description of Correlation Detector]

The first correlation detector 51 detects correlations between corresponding pixels between the image signal B and the image signal G, and obtains, based on the correlations, degrees of correlation (first degrees of correlation). The correlation detector 51 outputs correlation flags F1 each of which represents the degree of correlation. Specifically, an absolute value DIFF of each of difference values between the corresponding pixels between the image signal B and the image signal G is compared with threshold values TH1-TH3, and a correlation flag F1 having a value corresponding to a result of the comparison is output.

The second correlation detector 55 detects correlations between corresponding pixels between the image signal B and the image signal R, and obtains, based on the correlations, degrees of correlation (second degrees of correlation). The correlation detector 55 outputs correlation flags F2 each of which represents the degree of correlation. Specifically, an absolute value DIFF of each of difference values between the corresponding pixels between the image signal B and the image signal R is compared with the threshold values TH1-TH3, and a correlation flag F2 having a value corresponding to a result of the comparison is output.

Note that in the present embodiment, the correlation flags F1, F2 are represented by, for example, 2 bits, and take on values from 0 to 3. Thus, the first and second degrees of correlation are evaluated on a four-level scale. Moreover, when values of the correlation flags F1, F2 are the same, one of the values may be used. Alternatively, the correlation detectors 51, 55 may evaluate the degrees of correlation on an n-level scale (where n is an integer greater than or equal to 2), and in this case, the number of bits of the correlation flags F1, F2 may be set based on n.

[5-1-2. Description of Addition Ratio Determining Section]

The first addition ratio determining section 52 determines addition ratios (first addition ratios) of the corresponding pixels between the image signal B and the image signal G based on the values of the correlation flags F1, where the addition ratios are used in first weighted addition averaging processes performed by the weighted addition averaging section 53. Each first addition ratio can be expressed as m31:m32 (where m31+m32=1), where m31 refers to the proportion of a pixel of the image signal B, and m32 refers to the proportion of a pixel of the image signal G which are added up in the first weighted addition averaging process. For example, the addition ratio determining section 52 includes a table in which the correlation flag F1 and the first addition ratio are associated with each other, and the table is set such that when the value of the correlation flag F1 is relatively high, a relatively high value is provided to m32.

The second addition ratio determining section 56 determines addition ratios (third addition ratios) of the corresponding pixels between the image signal B and the image signal R based on the values of the correlation flags F2, where the addition ratios are used in third weighted addition averaging processes performed by the weighted addition averaging section 57. Each third addition ratio can be expressed as n31:n33 (where n31+n33=1), where n31 refers to the proportion of a pixel of the image signal B, and n33 refers to the proportion of a pixel of the image signal R which are added up in the third weighted addition averaging process. For example, the addition ratio determining section 56 includes a table in which the correlation flag F2 and the third addition ratio are associated with each other, and the table is set such that when the value of the correlation flag F2 is relatively high, a relatively high value is provided to n33.

Specifically, when the correlation flag F1=0 (the correlation is minimum), the addition ratio determining section 52 outputs m31=1, m32=0. When the correlation flag F1=1, m31=¾, m32=¼ are output. That is, when the value of the correlation flag F1 is relatively high, m32 has a relatively high value. When the correlation flag F1=2, m31=¼, m32=¾ are output. When the correlation flag F1=3 (the correlation is maximum), m31=0, m32=1 are output. As described above, when the correlation flag F1 represents that the correlation is minimum, the addition ratio determining section 52 may set m31 to a maximum value, whereas as the value of the correlation flag F1 increases, m31 may be reduced and m32 may be increased.

When the correlation flag F2=0 (the correlation is minimum), the addition ratio determining section 56 outputs n31=1, n33=0. When the correlation flag F2=1, n31=¾, n33=¼ are output. That is, when the value of the correlation flag F2 is relatively high, n33 has a relatively high value. When the correlation flag F2=2, n31=¼, n33=¾ are output. When the correlation flag F2=3 (the correlation is maximum), n31=0, n33=1 are output. As described above, when the correlation flag F2 represents that the correlation is minimum, the addition ratio determining section 56 may set n31 to a maximum value, whereas as the value of the correlation flag F2 increases, n31 may be reduced and n33 may be increased.

[5-1-3. Description of Weighted-Addition-Averaging Section]

The first weighted addition averaging section 53 performs the first weighted addition averaging processes on the corresponding pixels between the image signal B and the image signal G based on the first addition ratios. As a result of the first weighted addition averaging processes, the first weighted addition averaging section 53 outputs an image signal BAm serving as a first output image signal.

The second weighted addition averaging section 57 performs the third weighted addition averaging processes on the corresponding pixels between the image signal B and the image signal R based on the third addition ratios. As a result of the third weighted addition averaging processes, the second weighted addition averaging section 57 outputs an image signal BAn serving as a third output image signal.

Figure 14:
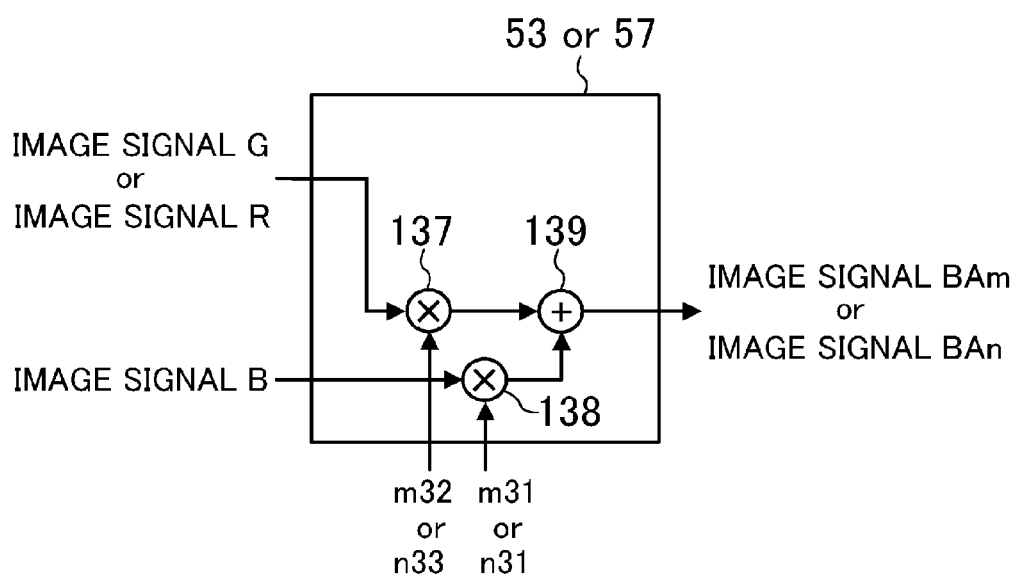
FIG. 14 is a block diagram illustrating an example configuration of a weighted addition averaging section according to the fifth embodiment.

FIG. 14 is a block diagram illustrating an example configuration of a weighted addition averaging section according to the present embodiment. Since the weighted addition averaging sections 53, 57 according to the present embodiment include substantially the same components, FIG. 14 illustrates both the weighted addition averaging sections 53, 57, but signals input to the sections may be different.

The weighted addition averaging sections 53, 57 each include multipliers 137, 138 and an adder 139. First, the weighted addition averaging section 53 will be described.

In the weighted addition averaging section 53, the multiplier 137 receives m32 and a pixel of the image signal G, and the multiplier 138 receives m31 and a pixel of the image signal B corresponding to the pixel of the image signal G. Each of results of operations by the multipliers 137, 138 is input to the adder 139, and the image signal BAm serving as a first output image signal is output as a result of the first weighted addition averaging processes. The image signal BAm is a B signal obtained by reducing noise included in the image signal B by the image signal G.

Next, the weighted addition averaging section 57 will be described.

In the weighted addition averaging section 57, the multiplier 137 receives n33 and a pixel of the image signal R, and the multiplier 138 receives n31 and a pixel of the image signal B corresponding to the pixel of the image signal R. Each of results of operations by the multipliers 137, 138 is input to the adder 139, and an image signal BAn serving as a third output image signal is output as a result of the third weighted addition averaging processes. The image signal BAn is a B signal obtained by reducing noise included in the image signal B by the image signal R.

[5-1-4. Description of Addition-Averaging Section]

Referring back to FIG. 13, the addition averaging section 58 receives outputs from the weighted addition averaging sections 53, 57, and adds up and averages the received outputs. Specifically, corresponding pixels between the image signal BAm and the image signal BAn are added up and averaged, thereby generating an image signal BA serving as a fourth output image signal, and the image signal BA is output.

[5-2. Outline of Operation of Noise Reduction Device]

In the noise reduction device 1 according to the present embodiment, the first weighted addition averaging processes are performed on the corresponding pixels between the image signal B and the image signal G based on first addition ratios according to the values of the correlation flags F1. Moreover, the third weighted addition averaging processes are performed on the corresponding pixels between the image signal B and the image signal R based on third addition ratios according to the values of the correlation flags F2. Addition-averaging processes are performed on the corresponding pixels between the image signal BAm and the image signal BAn after the first and third weighted addition averaging processes, and the image signal BA is output.

Figure 15:
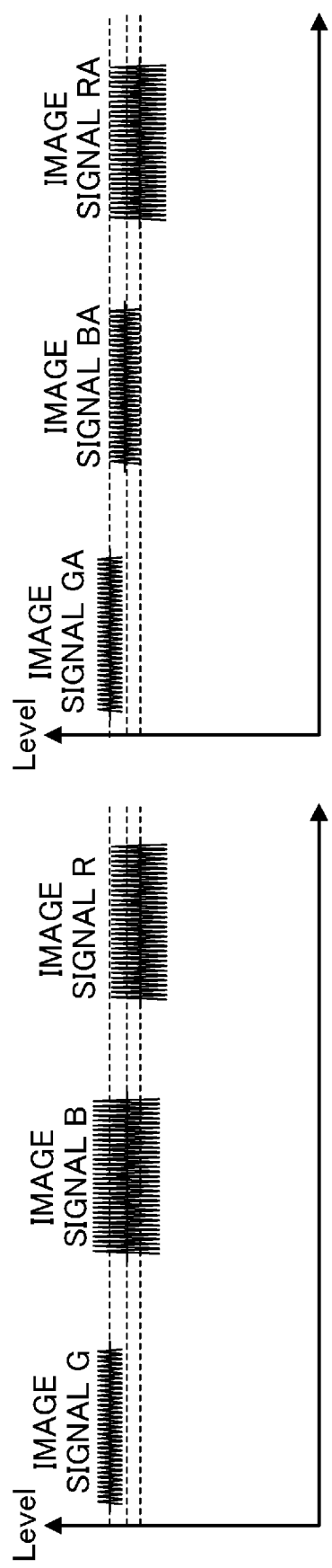
FIGS. 15A-15B are views illustrating how noise is reduced according to the fifth embodiment.

FIGS. 15A, 15B are views illustrating how noise is reduced according to the present embodiment. FIGS. 15A, 15B show waveform images of image signals of a G channel, a R channel, and a B channel displayed on an wave-form monitor. FIG. 15A shows the waveform images of the image signal G, the image signal R, and the image signal B input to the noise reduction device according to the present embodiment. FIG. 15B shows waveform images after the noise reduction in the case where the degrees of correlation between the corresponding pixels between the image signal B and the image signal G are maximum, and the degrees of correlation between the corresponding pixels between the image signal B and the image signal R are maximum, that is, in the case where the image signal BA is generated by adding up and averaging the image signal G and the image signal R. Note that the vertical axis in FIG. 15 indicates luminance which is signal levels of the image signal B, the image signal G, and the image signal R.

As illustrated in FIGS. 15A, 15B, it can be seen that the image signal BA is obtained which is the image signal B from which noise has been reduced by the noise reduction device according to the present embodiment.

[5-3. Advantages, Etc.]

When the signal to noise ratio (S/N ratio) of the image signal B is significantly low compared to that of image signal G and to that of the image signal R, the present embodiment is particularly effective to effectively reduce noise included in the image signal B. This is because when the degrees of correlation between the corresponding pixels between the image signal B and the image signal G, and between the corresponding pixels between the image signal B and the image signal R are significantly high, the image signal B can be replaced with the image signal G and the image signal R which have high S/N ratios.

—Variation—

[5-4. Description of Correlation Detector]

In the present variation, the first correlation detector 51 in the noise reduction device 1 illustrated in FIG. 13 adjusts threshold values TH1-TH3 based on the signal level of an image signal obtained by adding up and averaging the corresponding pixels between the image signal B and the image signal G. The second correlation detector 55 adjust the threshold values TH1-TH3 based on the signal level of an image signal obtained by adding up and averaging the corresponding pixels between the image signal B and the image signal R.

Specifically, when the signal level of the image signal obtained by adding up and averaging the corresponding pixels between the image signal B and the image signal G is greater than or equal to a predetermined level, the correlation detector 51 uses the threshold values TH1-TH3 without being adjusted to compute the value of the correlation flag F1. In contrast, when the signal level is lower than the predetermined level, the correlation detector 51 multiplies the threshold values TH1-TH3 by, for example, 2, and compares the multiplied threshold values TH1-TH3 with each absolute value DIFF, thereby computing the value of the correlation flag F1. Thus, when the signal level of the image signal obtained by adding up and averaging the corresponding pixels between the image signal B and the image signal G is smaller than the predetermined level, higher degrees of correlation are obtained by the correlation detector 51. As a result, it is possible to enhance the noise reduction effect.

Moreover, when the signal level of the image signal obtained by adding up and averaging the corresponding pixels between the image signal B and the image signal R is greater than or equal to the predetermined level, the correlation detector 55 uses the threshold values TH1-TH3 without being adjusted to compute the value of the correlation flag F2. In contrast, when the signal level is lower than the predetermined level, the correlation detector 55 multiplies the threshold values TH1-TH3 by, for example, 2, and compares the multiplied threshold values TH1-TH3 with each absolute value DIFF, thereby computing the value of the correlation flag F2. Thus, when the signal level of the image signal obtained by adding up and averaging the corresponding pixels between the image signal B and the image signal R is smaller than the predetermined level, higher degrees of correlation are obtained by the correlation detector 55. As a result, it is possible to enhance the noise reduction effect.

When the signal level of an image signal is low, that is, when the luminance of an image signal is low, the image signal is almost achromatic, but there are some cases where the proportion of noise in the image signal is relatively dominant. Therefore, even when the image signal is a signal representing an initially black subject such as a blackout curtain, unnatural coloring may occur due to the influence of noise.

Thus, as in the present variation, when a high degree of correlation is obtained in the case of an image signal which is lower than the predetermined level, so that the noise reduction effect is enhanced, and thus it is possible to reduce the unnatural coloring occurring in the blackout curtain, etc. That is, the image signal can be maintained in an initial state in which the image signal is almost achromatic.

Note that in the present variation, when the signal level is low, the threshold values TH1-TH3 may be multiplied by α (where α is a positive real number), and the multiplied threshold values TH1-TH3 may be compared with the absolute value DIFF. Alternatively, the threshold values TH1-TH3 may be used when the signal level is high, and threshold values TH1'-TH3' which are set independently from the threshold values TH1-TH3 may be used when the signal level is low.

In the present variation, the signal level is compared with one predetermined level to evaluate the signal level on a two-level scale. However, the signal level may be compared with a plurality of predetermined levels to evaluate the signal level on a three- or more-level scale. In this case, the threshold values TH1-TH3 may be changed in a step-by-step manner by multiplying by, for example, 2 and 3 so that the degree of correlation increases as the signal level lowers. Thus, it is possible to obtain a suitable noise reduction effect according to the signal level.

In the present variation, as the signal level, a signal level of an image signal obtained by adding up and averaging the corresponding pixels between the image signal B and the image signal G, and a signal level of an image signal obtained by adding up and averaging the corresponding pixels between the image signal B and the image signal R are used. However, signal levels of the image signal B and the image signal G, and signal levels of the image signal B and the image signal R may be used.

Sixth Embodiment

A sixth embodiment will be described below with reference to FIGS. 16-19.

[6-1. Entire Configuration of Noise Reduction Device]

Figure 16:
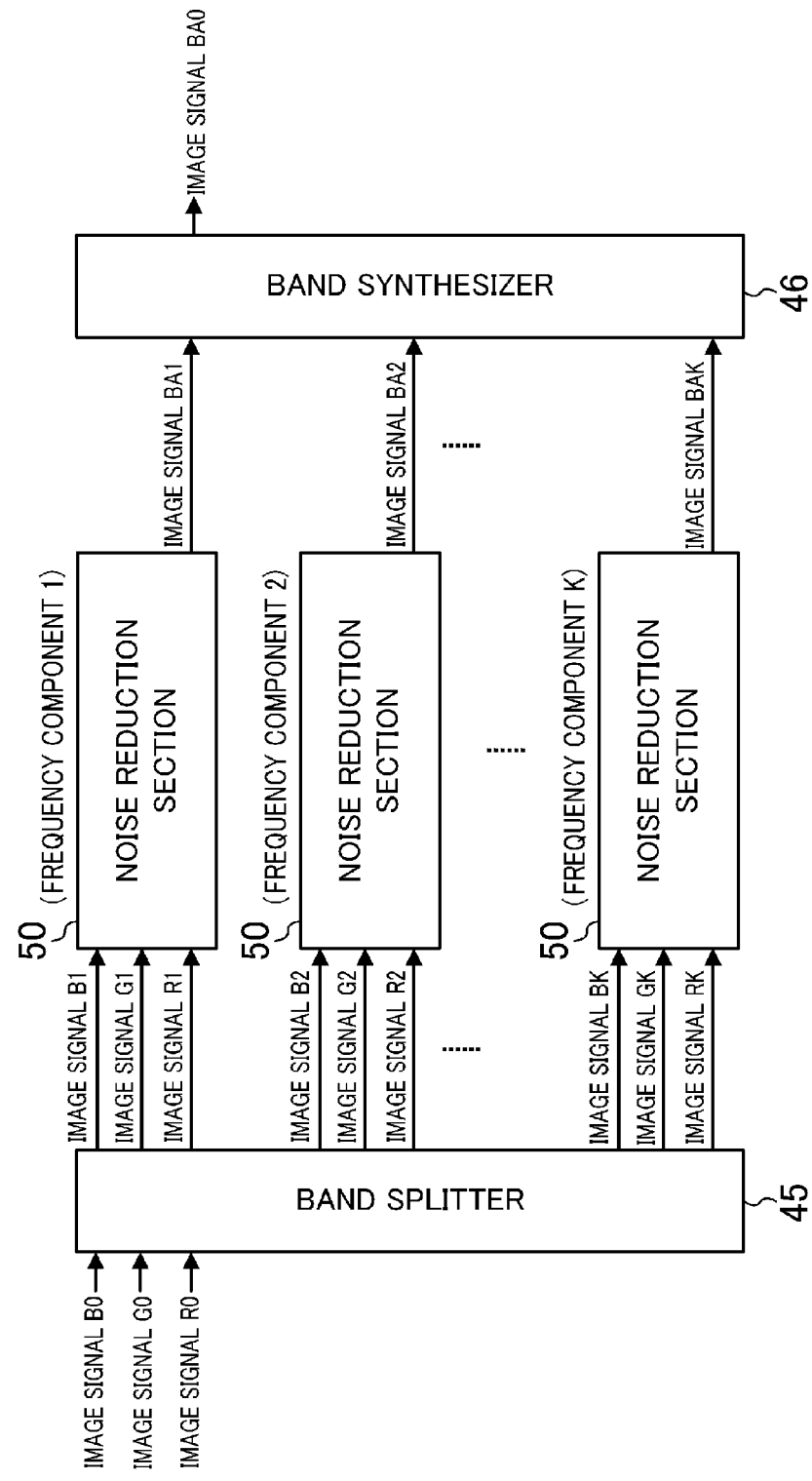
FIG. 16 is a block diagram illustrating an example configuration of a noise reduction device according to a sixth embodiment.

FIG. 16 is a block diagram illustrating an example configuration of a noise reduction device according to the sixth embodiment. The noise reduction device 1 includes a band splitter 45, the noise reduction section 50 of FIG. 13 including K noise reduction sections (where K is an integer greater than or equal to 2), and a band synthesizer 46.

The band splitter 45 receives for example, a blue (B) signal (hereinafter referred to as an image signal B0), a green (G) signal (hereinafter referred to as image signal G0), and a red (R) signal (hereinafter referred to as image signal R0) which are obtained from an identical image. The band splitter 45 splits each of the image signal B0, the image signal G0, and the image signal R0 into frequency components 1-K. In FIG. 16, image signals B1-BK are signals obtained by splitting the image signal B0 into K types of frequency components, and are first image signals each input to a corresponding one of the noise reduction sections 50. Image signals G1-GK are signals obtained by splitting the image signal G0 into K types of frequency components, and are second image signals each input to a corresponding one of the noise reduction sections 50. Image signals R1-RK are signals obtained by splitting the image signal R0 into K types of frequency components, and are third image signals each input to a corresponding one of the noise reduction sections 50. One of the image signals B1-BK, one of the image signals G1-GK, and one of the image signals R1-RK which have the same frequency are organized into each of K groups, and the band splitter 45 outputs each of the K groups to a different one of the noise reduction sections 50.

In FIG. 16, as to the image signals B1-BK, the image signals G1-GK, and the image signals R1-RK, the same end digits indicate that the signals have the same frequency. For example, since the image signal B1, the image signal G1, and the image signal R1 have the same frequency, the image signal B1, the image signal G1, and the image signal R1 are organized into a group, which is input to a corresponding one of the noise reduction sections 50. Moreover, in FIG. 16, the frequency components 1-K represent groups of image signals having the same frequency of the image signals B1-BK, the image signals G1-GK, and the image signals R1-RK. Digits represented by 1-K correspond to the end digits of the image signals B1-BK, the image signals G1-GK, and the image signals R1-RK. Moreover, as to the image signals B1-BK, the image signals G1-GK, and the image signals R1-RK, the larger the end digit is, the higher the frequency is.

[6-1-1. Description of Noise Reduction Section]

Each noise reduction section 50 receives a group of image signals corresponds thereto out of the image signals B1-BK, the image signals G1-GK, and the image signals R1-RK, and performs the noise reduction process as described in the fifth embodiment. For example, the noise reduction section 50 to which the image signal B1, the image signal G1, and the image signal R1 are input receives the image signal B1, the image signal G1, and the image signal R1 respectively as the image signal B, the image signal G, and the image signal R of the fifth embodiment. The noise reduction section 50 reduces noise included in the image signal B1 by using the image signal G1 and the image signal R1, and outputs an image signal BA1 serving as a fourth output image signal as the image signal BA of the fifth embodiment.

[6-1-2. Configuration of Band Splitter]

Figure 17:
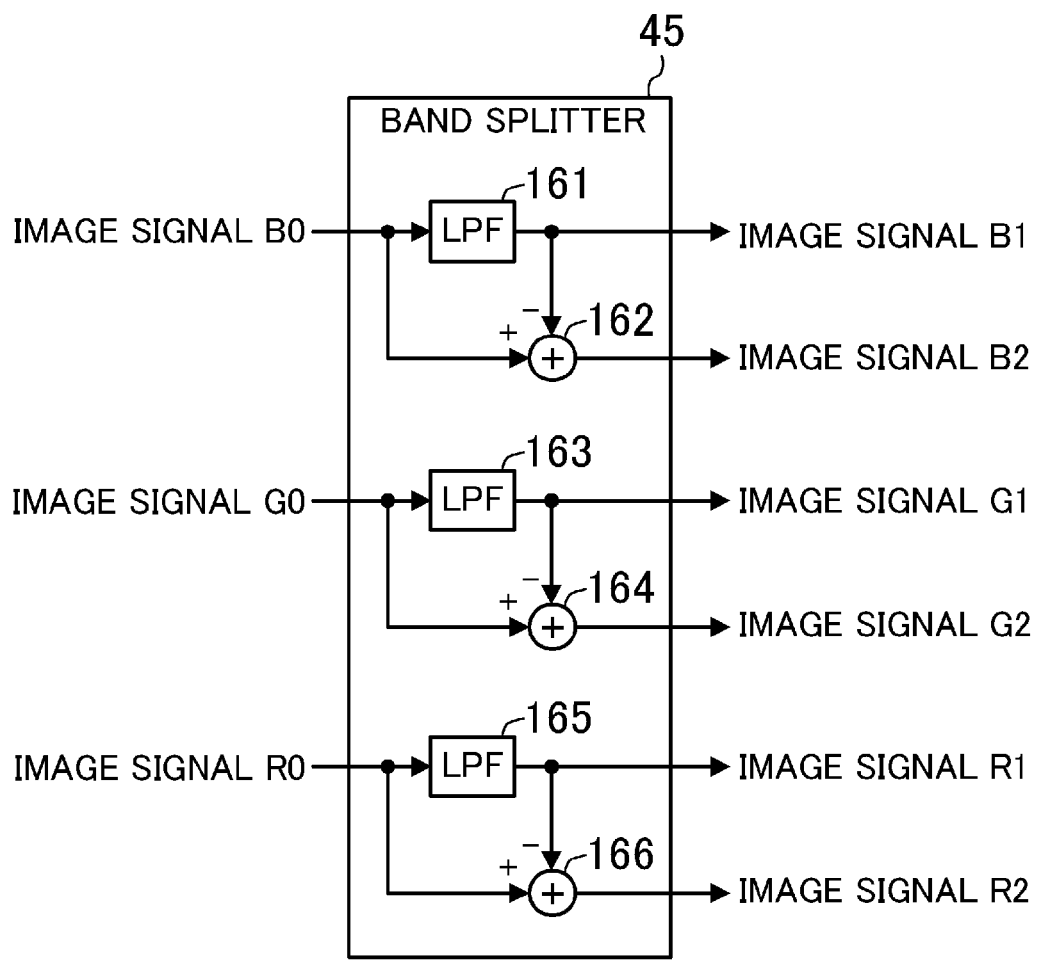
FIG. 17 is a block diagram illustrating an example configuration of a band splitter according to the sixth embodiment.

FIG. 17 is a block diagram illustrating an example configuration of the band splitter according to the present embodiment. The band splitter 45 illustrated in FIG. 17 is configured to split each of the image signal B0, the image signal G0, and the image signal R0 into two frequency components.

The band splitter 45 includes lowpass filters 161, 163, 165 and subtracters 162, 164, 166.

The lowpass filter 161 receives the image signal B0, and outputs of frequency components included in the image signal B0, the image signal B1 which is a low-frequency component (frequency component 1). The subtracter 162 subtracts the image signal B1 from the image signal B0 to generate the image signal B2 which is a high-frequency component (frequency component 2), and outputs the image signal B2.

The lowpass filter 163 receives the image signal G0, and outputs the image signal G1 which is a low-frequency component (frequency component 1). The subtracter 164 subtracts the image signal G1 from the image signal G0 to generate the image signal G2 which is a high-frequency component (frequency component 2), and outputs the image signal G2.

The lowpass filter 165 receives the image signal R0, and outputs the image signal R1 which is a low-frequency component (frequency component 1). The subtracter 166 subtracts the image signal R1 from the image signal R0 to generate the image signal R2 which is a high-frequency component (frequency component 2), and outputs the image signal R2.

As described above, a group of the image signal B1, the image signal G1, and the image signal R1, and a group of the image signal B2, the image signal G2, and the image signal R2, which are two groups of image signals output from the band splitter 45, are each input to a different one of the noise reduction sections 50.

[6-1-3. Configuration of Band Synthesizer]

Figure 18:
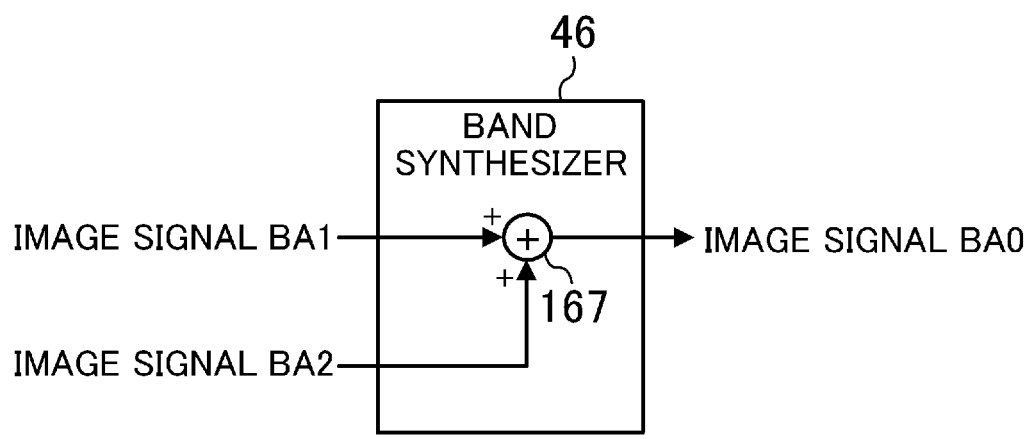
FIG. 18 is a block diagram illustrating an example configuration of a band synthesizer according to the sixth embodiment.

FIG. 18 is a block diagram illustrating an example configuration of the band synthesizer according to the present embodiment. The band synthesizer 46 illustrated in FIG. 18 is configured to perform band synthesis of the image signals BA1, BA2.

The band synthesizer 46 includes an adder 167. The adder 167 adds up the image signals BA1, BA2 to generate an image signal BA0, and outputs the image signal BA0.

[6-2. Outline of Operation of Noise Reduction Device]

As described above, in the noise reduction device 1 according to the present embodiment, each of the image signal B0, the image signal G0, and the image signal R0 is split into K types of frequency components, and then the image signals B1-BK are subjected to the noise reduction process. The image signals BA1-BAK after the noise reduction are band-synthesized to generate the image signal BA0.

Figure 19A:
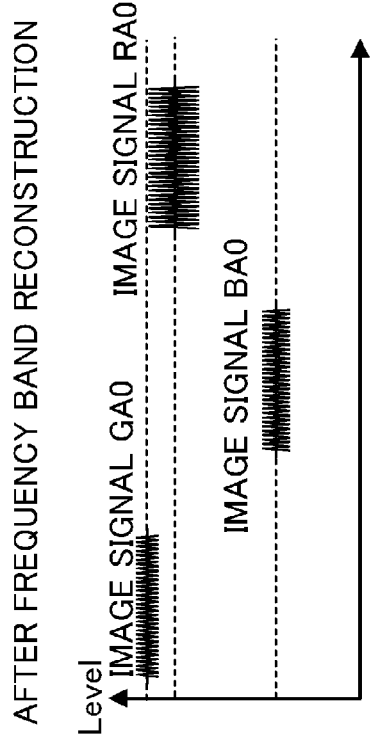
FIGS. 19A-19D are views illustrating how noise is reduced according to the sixth embodiment.
Figure 19D:
Figure 19B:
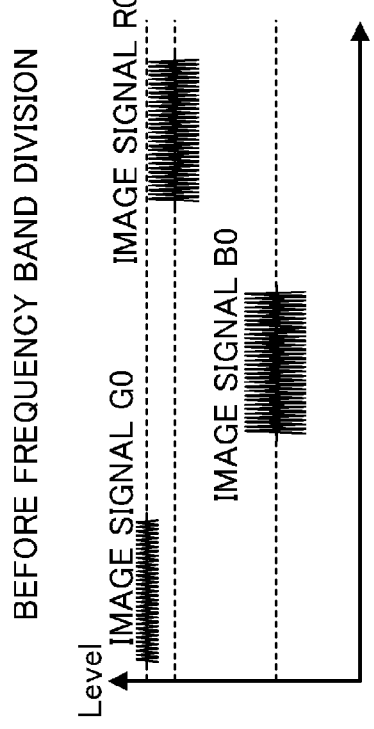
Figure 19C:
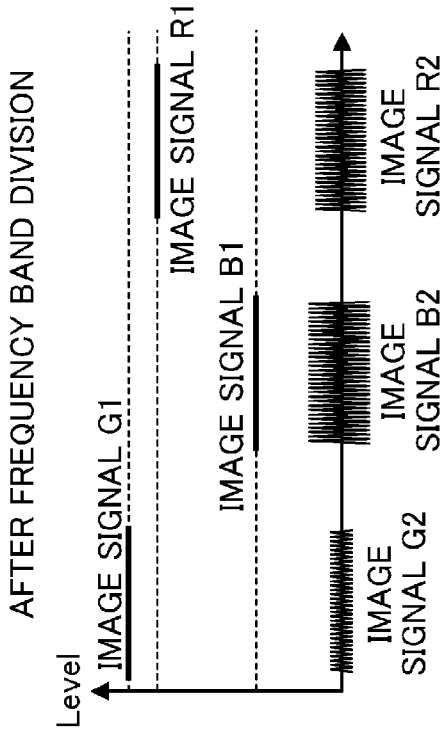

FIGS. 19A-19D are views illustrating how noise is reduced in the present embodiment. FIGS. 19A-19D shows waveform images of image signals of a B channel, a G channel, and an R channel displayed on a waveform monitor. FIG. 19A shows waveform images of the image signal B0, the image signal G0, and the image signal R0 input to the noise reduction device 1 according to the present embodiment. FIG. 19B shows waveform images obtained after each of the image signal B0, the image signal G0, and the image signal R0 is band-split into a low-frequency component and a high-frequency component. FIG. 19C shows waveform images obtained after noise in the image signals of FIG. 19B is reduced when the degrees of correlation are maximum. FIG. 19D shows waveform images obtained after the image signals BA1, BA2 are band-synthesized, the image signals GA1, GA2 are band-synthesized, and the image signals RA1, RA2 are band-synthesized.

As illustrated in FIGS. 19A-19D, it can be seen that when the noise reduction process is performed on each frequency component of the image signals B1, B2, noise included in the image signal B2 which is the high-frequency component is more effectively reduced.

[6-3. Advantages, Etc.]

As described above, according to the present embodiment, each of the image signal B0, the image signal G0, and the image signal R0 is split into a plurality of frequency components, so that the noise reduction process can be performed on each group of image signals having the same frequency. That is, even when signal levels of the image signal B0, the image signal G0, and the image signal R0 significantly differ from one another, the noise reduction process can be performed by varying first and third addition ratios based on the signal levels of the image signals of each frequency component. Thus, for example, when the image signals which are low-frequency components have a low noise level, and the image signals which are high-frequency components have a high noise level, it is possible to enhance the noise reduction effect particularly on the image signals which are the high-frequency components.

The present embodiment has described the case where each of the image signal B0, the image signal G0, and the image signal R0 is split into two frequency components, which are then synthesized. However, each of the image signal B0, the image signal G0, and the image signal R0 may be split into three or more frequency components, which may then be synthesized.

Seventh Embodiment

A seventh embodiment will be described below with reference to FIG. 20.

[7-1. Entire Configuration of Noise reduction Device]

Figure 20:
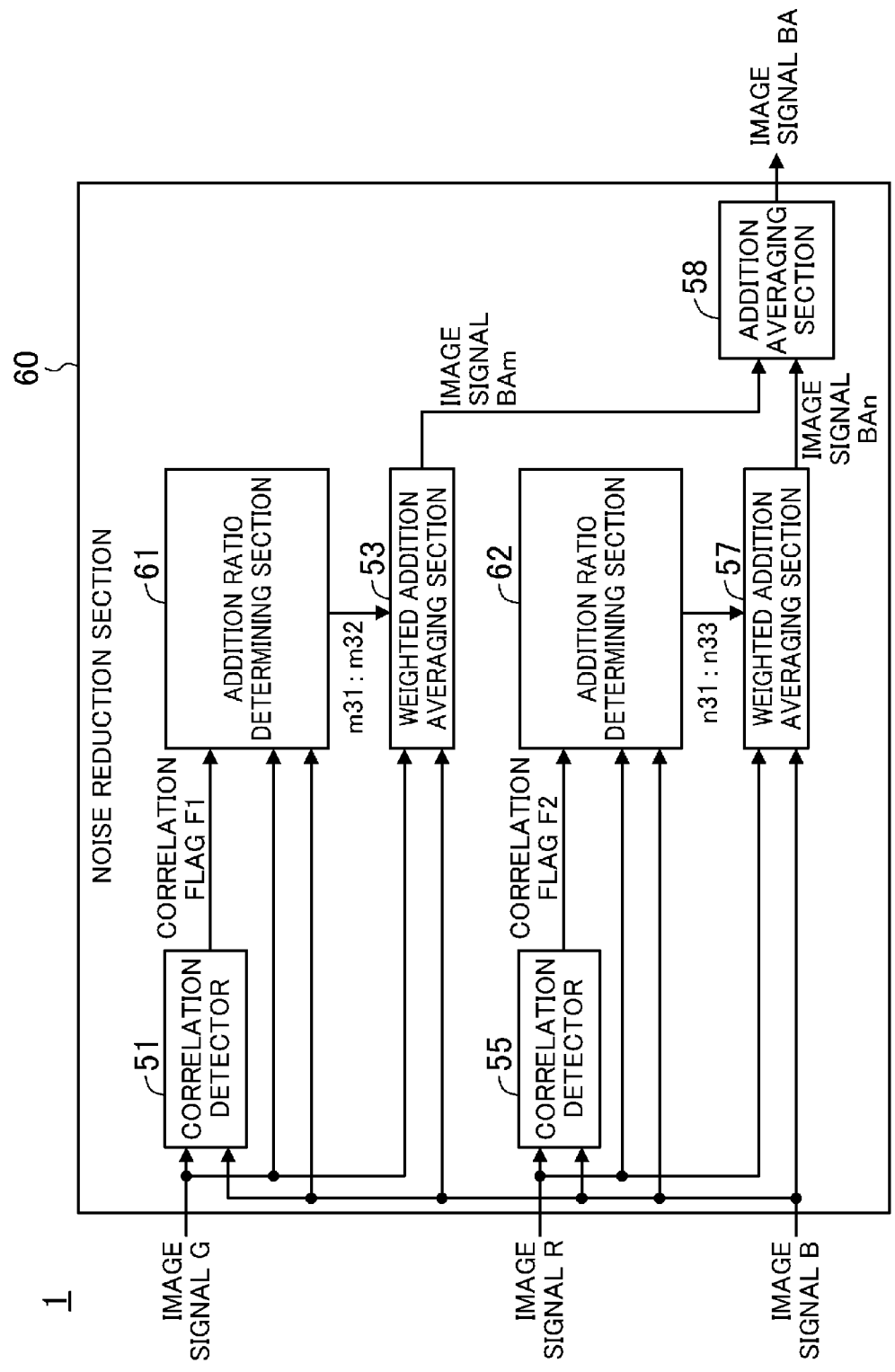
FIG. 20 is a block diagram illustrating an example configuration of a noise reduction device according to a seventh embodiment.

FIG. 20 is a block diagram illustrating an example configuration of a noise reduction device according to the seventh embodiment. A noise reduction section 60 illustrated in FIG. 20 includes first and second correlation detector 51, 55, first and second addition ratio determining section 61, 62, first and second weighted addition averaging sections 53, 57, and an addition averaging section 58.

[7-1-1. Description of Addition Ratio Determining Section]

The first addition ratio determining section 61 determines addition ratios of corresponding pixels between an image signal B and an image signal G (first addition ratios) based on values of correlation flags F1, where the first addition ratios are used in first weighted addition averaging processes performed by the weighted addition averaging section 53. Each first addition ratio is expressed as m31:m32 (where m31+m32=1), where m31 refers to the proportion of a pixel of the image signal B, m32 refers to the proportion of a pixel of the image signal G which are added up in the first weighted addition averaging process. Moreover, the addition ratio determining section 61 receives the image signal B and the image signal G, and adjusts m31 and m32 based on signal levels of the image signal B and the image signal G.

For example, when the signal levels of the image signal B and the image signal G are lower than a predetermined level, the addition ratio determining section 61 adjusts the first addition ratio so that m31=0, and m32=1, and outputs the adjusted first addition ratio. When the signal levels of the image signal B and the image signal G are higher than or equal to the predetermined level, the addition ratio determining section 61 outputs the first addition ratio without being adjusted.

The second addition ratio determining section 62 determines addition ratios of corresponding pixels between the image signal B and an image signal R (third addition ratios) based on values of correlation flags F2, where the third addition ratios are used in third weighted addition averaging processes performed by the weighted addition averaging section 57. Each third addition ratio is expressed as n31:n33 (where n31+n33=1), where n31 refers to the proportion of a pixel of the image signal B, and n33 refers to the proportion of a pixel of the image signal R which are added up in the third weighted addition averaging process. Moreover, the addition ratio determining section 62 receives the image signal B and the image signal R, and adjusts n31 and n33 based on signal levels of the image signal B and the image signal R.

For example, when the signal levels of the image signal B and the image signal R are lower than a predetermined level, the addition ratio determining section 62 adjusts the third addition ratio so that n31=0, and n33=1, and outputs the adjusted third addition ratio. When the signal levels of the image signal B and the image signal R are higher than or equal to the predetermined level, the addition ratio determining section 62 outputs the third addition ratio without being adjusted.

[7-2. Advantages, Etc.]

As described above, according to the present embodiment, even if the degrees of correlation decrease due to, for example, noise included in the image signal B, the image signal G, and the image signal R, resulting in deviation of the first and third addition ratios from desired ratios, the first and third addition ratios can be corrected when the signal levels of the image signal B and the image signal G, and the signal levels of the image signal B and the image signal R are lower than the predetermined level.

When the signal level of an image signal is low, that is, when the luminance of an image signal is low, the image signal is almost achromatic, but there are some cases where the proportion of noise in the image signal is relatively dominant. Therefore, even when the image signal is a signal representing an initially black subject such as a blackout curtain, unnatural coloring may occur due to the influence of noise.

Thus, as in the present embodiment, when an image signal has a signal level lower than the predetermined level, each first addition ratio is corrected so that m31=0 and m32=1, and each third addition ratio is corrected so that n31=0 and n33=1, so that the noise reduction effect is enhanced, and thus it is possible to reduce the unnatural coloring occurring in the blackout curtain, etc. That is, the image signal can be maintained in an initial state in which the image signal is almost achromatic.

In the present embodiment, the signal level is compared with one predetermined level to evaluate the signal level on a two-level scale. However, the signal level may be compared with a plurality of predetermined levels to evaluate the signal level on a three- or more-level scale. In this case, the first addition ratio may be changed in a step-by-step manner so that m32 increases as the signal level lowers, and the third addition ratio may be changed in a step-by-step manner so that n33 increases as the signal level lowers.

Eighth Embodiment

An eighth embodiment will be described below with reference to FIGS. 21 and 22.

[8-1. Entire Configuration of Noise Reduction Device]

Figure 21:
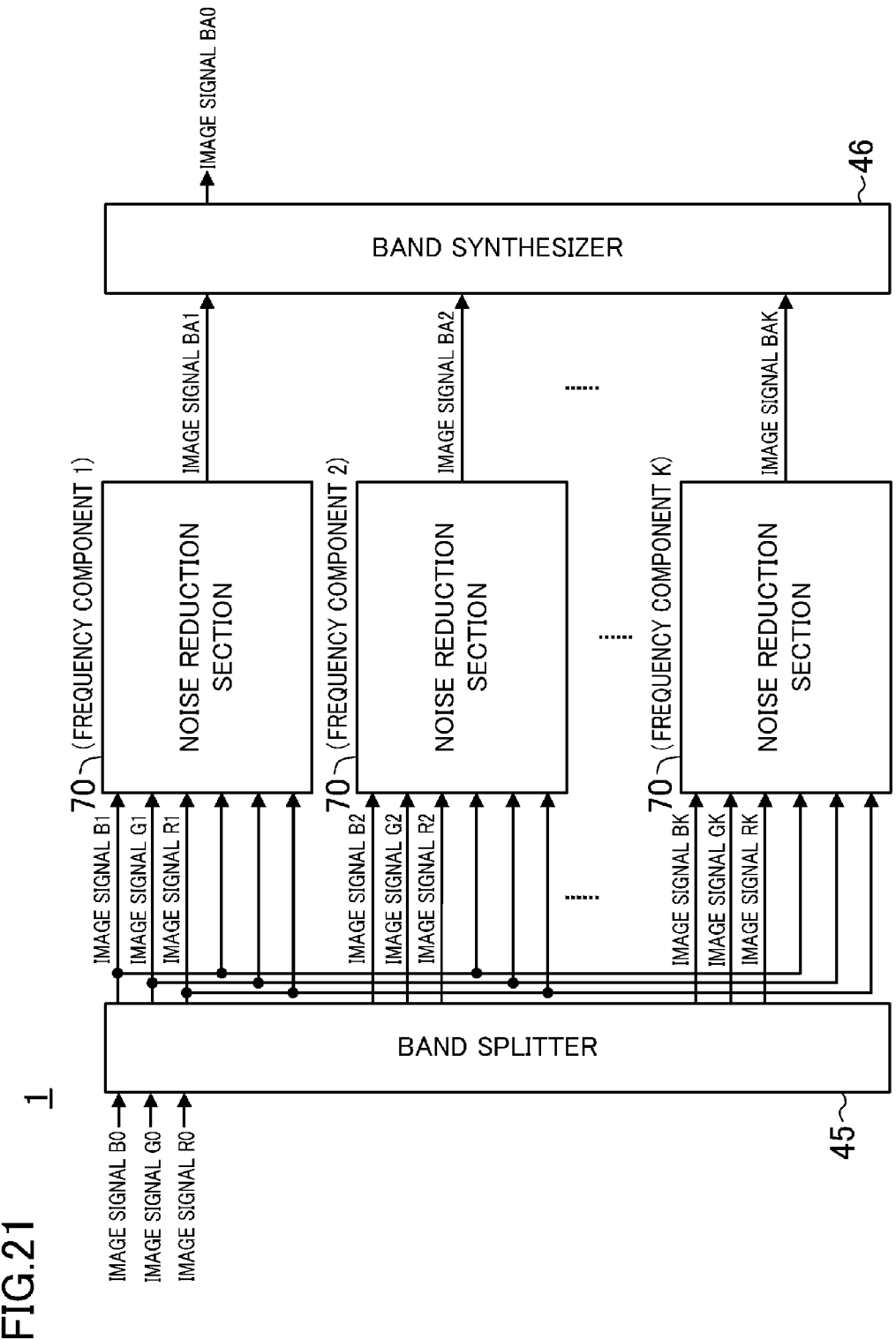
FIG. 21 is a block diagram illustrating an example configuration of a noise reduction device according to an eighth embodiment.

FIG. 21 is a block diagram illustrating an example configuration of a noise reduction device according to the eighth embodiment. A noise reduction device 1 includes a band splitter 45, K noise reduction sections 70 (where K is an integer greater than or equal to 2), and a band synthesizer 46. The configuration of the noise reduction section 70 will be described later.

In FIG. 21, as to the image signals B1-BK, the image signals G1-GK, and the image signals R1-RK, the same end digits indicate that the signals have the same frequency. For example, the image signal B1, the image signal G1, and the image signal R1 have the same frequency. That is, the image signal B1, the image signal G1, and the image signal R1 are organized into a group, which is input to a corresponding one of the noise reduction sections 70. Moreover, in FIG. 21, frequency components 1-K represent groups of image signals having the same frequency of the image signals B1-BK, the image signals G1-GK, and the image signals R1-RK. Digits represented by 1-K correspond to the end digits of the image signals B1-BK, the image signals G1-GK, and the image signals R1-RK. Moreover, as to the image signals B1-BK, the image signals G1-GK, and the image signals R1-RK, the larger the end digit is, the higher the frequency is.

Each K noise reduction section 70 receives a group of image signals corresponding thereto out of the image signals B1-BK, the image signals G1-GK, and the image signals R1-RK. Moreover, of the image signals B1-BK, the image signals G1-GK, and the image signals R1-RK, the image signal B1, the image signal G1, and the image signal R1, which are a group of image signals each having the lowest frequency, that is, image signals of the frequency component 1 are commonly input to each noise reduction section 70. The image signals of the frequency component 1, which are low-frequency components, can be considered to represent DC levels of an image signal B0, an image signal G0, and an image signal R0.

[8-1-1. Description of Noise Reduction Section]

Figure 22:
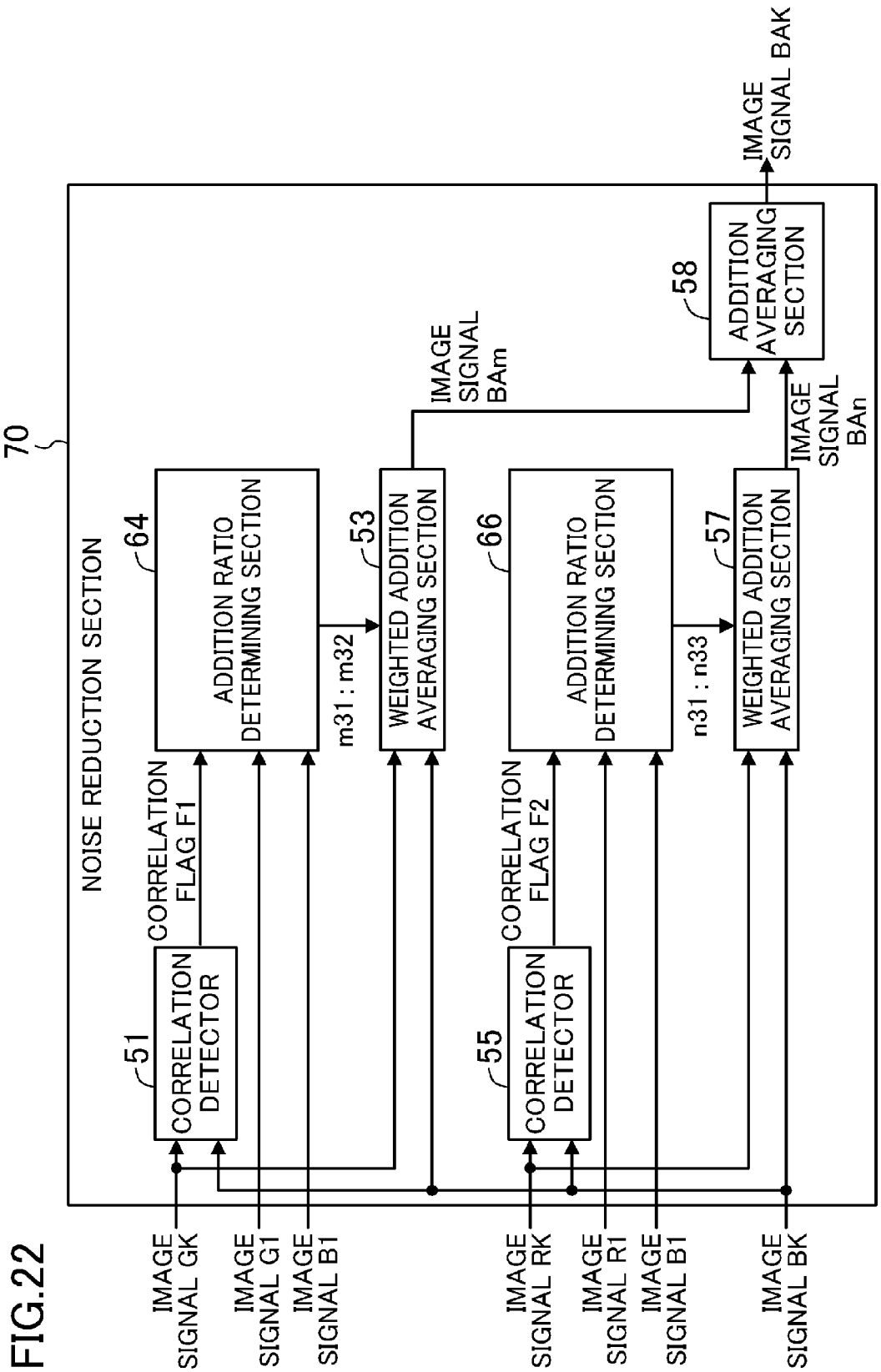
FIG. 22 is a block diagram illustrating an example configuration of a noise reduction section according to the eighth embodiment.

FIG. 22 is a block diagram illustrating an example configuration of a noise reduction section according to the present embodiment. The noise reduction section 70 illustrated in FIG. 22 reduces noise included in the image signal BK which is the image signal of the frequency component K of FIG. 21. The noise reduction section 70 includes first and second correlation detectors 51, 55, first and second addition ratio determining sections 64, 66, first and second weighted addition averaging sections 53, 57, and an addition averaging section 58.

In FIG. 22, the first correlation detector 51 detects correlations between corresponding pixels between the image signal BK and the image signal GK, and obtains, based on the correlations, degrees of correlation between the pixels. The correlation detector 51 outputs correlation flags F1 each of which represents the degree of correlation.

The first addition ratio determining section 64 determines addition ratios (first addition ratios) of the corresponding pixels between the image signal BK and the image signal GK based on values of the correlation flags F1, where the addition ratios are used in first weighted addition averaging processes performed by the weighted addition averaging section 53. Each first addition ratio can be expressed as m31:m32 (where m31+m32=1), where m31 refers to the proportion of a pixel of the image signal BK, and m32 refers to the proportion of a pixel of the image signal GK which are added up in the first weighted addition averaging process. Moreover, the addition ratio determining section 64 receives the image signal B1 and the image signal G1, and adjusts the first addition ratio based on signal levels of the image signal B1 and the image signal G1.

Specifically, when the signal levels of the image signal B1 and the image signal G1 are lower than a predetermined level, the addition ratio determining section 64 adjusts each first addition ratio so that m31=0, m32=1 to obtain an adjusted first addition ratio, and outputs the adjusted first addition ratio. When the signal levels of the image signal B1 and the image signal G1 are higher than or equal to a predetermined level, the addition ratio determining section 64 outputs each first addition ratio without being adjusted.

The second correlation detector 55 detects correlations between corresponding pixels between the image signal BK and the image signal RK, and obtains, based on the correlations, degrees of correlation between the pixels. The correlation detector 55 outputs correlation flags F2 each of which represents the degree of correlation.

The second addition ratio determining section 66 determines addition ratios (third addition ratios) of the corresponding pixels between the image signal BK and the image signal RK based on values of the correlation flags F2, where the addition ratios are used in third weighted addition averaging processes performed by the weighted addition averaging section 57. Each third addition ratio can be expressed as n31:n33 (where n31+n33=1), where n31 refers to the proportion of a pixel of the image signal BK, and n33 refers to the proportion of a pixel of the image signal RK which are added up in the third weighted addition averaging process. Moreover, the addition ratio determining section 66 receives the image signal B1 and the image signal R1, and adjusts the third addition ratio based on the signal levels of the image signal B1 and the image signal R1.

Specifically, when the signal levels of the image signal B1 and the image signal R1 are lower than a predetermined level, the addition ratio determining section 66 adjusts each third addition ratio so that n31=0, n33=1 to obtain an adjusted third addition ratio, and outputs the adjusted third addition ratio. When the signal levels of the image signal B1 and the image signal R1 are higher than or equal to a predetermined level, the addition ratio determining section 66 outputs each third addition ratio without being adjusted.

[8-2. Advantages, Etc.]

As described above, in the present embodiment, each of the image signal B0, the image signal G0, and the image signal R0 is split into a plurality of frequency components, and the first addition ratios of the image signals of each frequency component are corrected based on the signal levels of the image signal B1 and the image signal G1, and the third addition ratios of the image signals of each frequency component are corrected based on the signal levels of the image signal B1 and the image signal R1.

Therefore, even when the signal levels of the image signal B0, the image signal G0, and the image signal R0 are significantly different from one another, the first and third addition ratios of the image signals of each frequency component can be suitably corrected. That is, even when the degrees of correlation decreases due to, for example, noise included in the image signals of each frequency component, resulting in deviation of the first and third addition ratios from desired ratios, the first and third addition ratios can be corrected to suitable ratios. As a result, it is possible to effectively reduce noise included in the image signals of each frequency component. For example, when the image signals which are low-frequency components have a low noise level, and the image signals which are high-frequency components have a high noise level, it is possible to enhance the noise reduction effect particularly on the image signals which are the high-frequency components.

—Variation—

Figure 23:
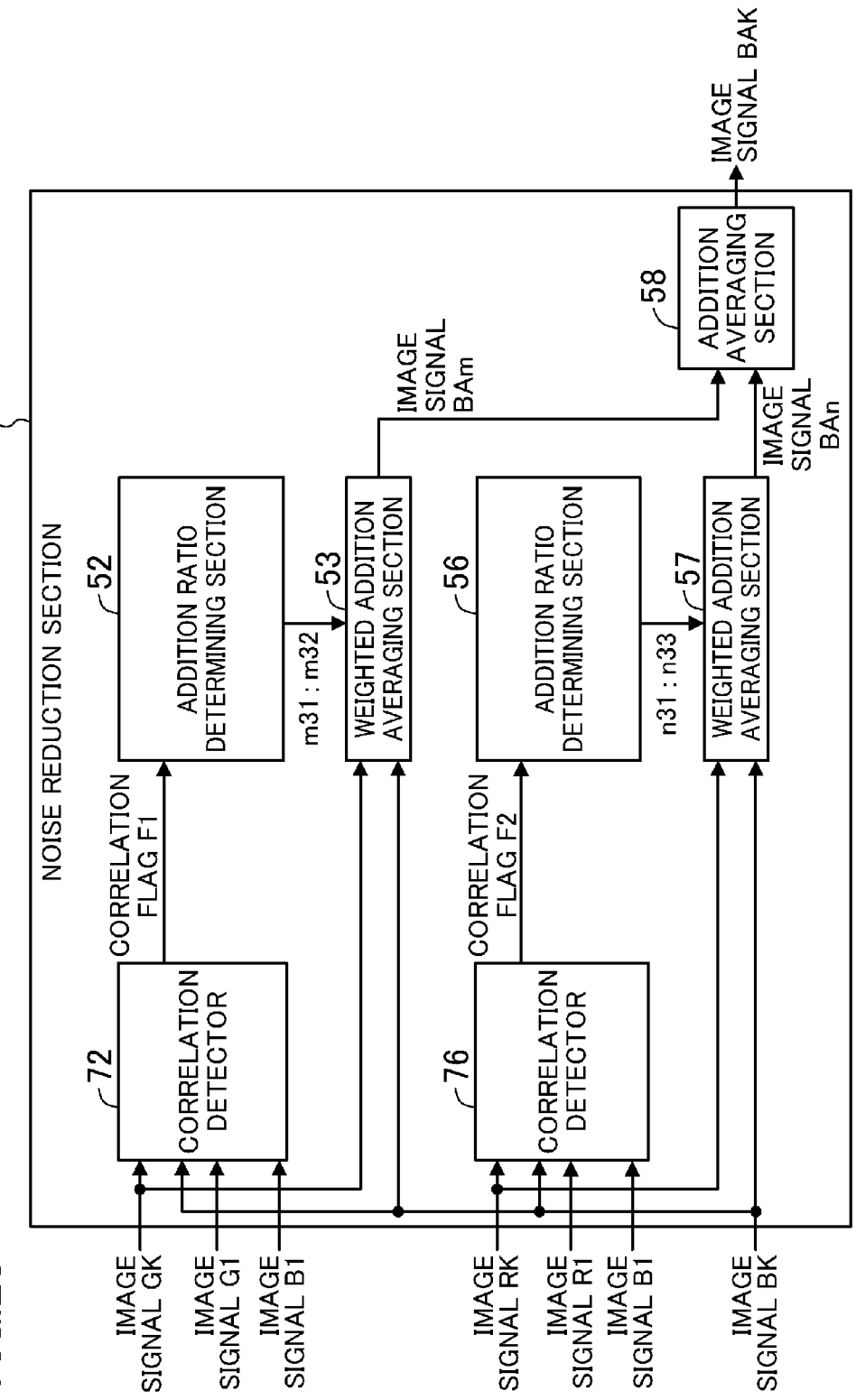
FIG. 23 is a block diagram illustrating an example configuration of a noise reduction section according to a variation of the eighth embodiment.

A variation of the eighth embodiment will be described below with reference to FIG. 23. In the present variation, a noise reduction section 80 illustrated in FIG. 23 is used instead of the noise reduction section 70 of FIG. 21 and FIG. 22.

[8-3. Configuration of Noise Reduction Section]

The noise reduction section 80 includes first and second correlation detectors 72, 76, first and second addition ratio determining sections 52, 56, first and second weighted addition averaging sections 53, 57, and an addition averaging section 58.

[8-3-1. Description of Correlation Detector]

Of image signals B1-BK and image signals G1-GK, for example, the image signal BK and the image signal GK as a group of image signals having the same frequency are input to the first correlation detector 72. Of the image signals B1-BK and the image signals G1-GK, the image signal B1 and the image signal G1 as a group of image signals each having the lowest frequency are also input to the correlation detector 72. The image signal B1 and the image signal G1 are image signals which are low-frequency components, and thus can be considered to represent DC levels of the image signal B0 and the image signal G0.

The correlation detector 72 detects correlations between corresponding pixels between the image signal BK and the image signal GK, and obtains, based on the correlations, degrees of correlation between the pixels. The correlation detector 72 outputs correlation flags F1 representing the degrees of correlation. Specifically, the correlation detector 72 compares an absolute value DIFF of each of difference values between the corresponding pixels between the image signal BK and the image signal GK with threshold values TH1-TH3, and outputs a correlation flag F1 based on a result of the comparison. Moreover, the correlation detector 72 adjusts the threshold values TH1-TH3 according to the signal levels of the image signal B1 and the image signal G1.

For example, when the signal levels are higher than or equal to a predetermined level, the correlation detector 72 uses the threshold values TH1-TH3 without being adjusted to compute the value of the correlation flag F1. In contrast, when the signal levels are lower than the predetermined level, the correlation detector 72 multiplies the threshold values TH1-TH3 by, for example, 2, and compares the multiplied threshold values TH1-TH3 with each absolute value DIFF to compute the value of the correlation flag F1. Thus, when the signal levels are lower than the predetermined level, the correlation detector 72 obtains a high degree of correlation. As a result, the noise reduction effect can be enhanced.

Of the image signals B1-BK and the image signals R1-RK, for example, the image signal BK and the image signal RK as a group of image signals having the same frequency are input to the second correlation detector 76.

Of the image signals B1-BK and the image signals R1-RK, the image signal B1 and the image signal R1 as a group of image signals each having the lowest frequency are also input to the correlation detector 76. The image signal B1 and the image signal R1 are image signals which are low-frequency components, and thus can be considered to represent DC levels of the image signal B0 and the image signal R0.

The correlation detector 76 detects correlations between corresponding pixels between the image signal BK and the image signal RK, and obtains, based on the correlations, degrees of correlation between the pixels. The correlation detector 76 outputs correlation flags F2 each of which represents the degree of correlation. Specifically, the correlation detector 76 compares an absolute value DIFF of each of difference values between the corresponding pixels between the image signal BK and the image signal RK with threshold values TH1-TH3, and outputs a correlation flag F2 based on a result of the comparison. Moreover, the correlation detector 76 adjusts the threshold values TH1-TH3 according to the signal levels of the image signal B1 and the image signal R1.

For example, when the signal levels are higher than or equal to a predetermined level, the correlation detector 76 uses the threshold values TH1-TH3 without being adjusted to compute the value of the correlation flag F2. In contrast, when the signal levels are lower than the predetermined level, the correlation detector 76 multiplies the threshold values TH1-TH3 by, for example, 2, and compares the multiplied threshold values TH1-TH3 with each absolute value DIFF to compute the value of the correlation flag F2. Thus, when the signal levels are lower than the predetermined level, the correlation detector 76 obtains a high degree of correlation. As a result, the noise reduction effect can be enhanced.

[8-4. Advantages, Etc.]

As described above, in the present variation, when the signal levels of the image signal B1 and the image signal G1 which are low-frequency components, and the signal levels of the image signal B1 and the image signal R1 which are low-frequency components are lower than the predetermined level, higher degrees of correlation between the image signals of each frequency component are obtained, so that it is possible to enhance the noise reduction effect of the noise reduction section 80.

Other Embodiments

As described above, the first to eighth embodiments have been described as example techniques disclosed in the present application. However, the techniques according to the present disclosure are not limited to these embodiments, but are also applicable to those where modifications, substitutions, additions, and omissions are made. In addition, elements described in the first to eighth embodiments may be combined to provide a different embodiment.

Therefore, other embodiments will be described as examples.

In the first to fourth embodiments, it has been described that as the value of the correlation flag F increases, m11 and m21 equal m12 and m22, respectively, but m11 and m21 may approximate m12 and m22, respectively. That is, when the correlation flag F represents that the correlation is minimum, m11 and m22 are set to maximum values, and as the value of the correlation flag F increases, m11 may be reduced, and m12 may be increased so that m11 approximates m12, and m21 may be increased, and m22 may be reduced so that m21 approximates m22.

Moreover, in the third and fourth embodiments, as the signal levels of the image signals decrease, m11 may be reduced, and m12 may be increased so that m11 approximates m12, and m21 may be increased, and m22 may be reduced so that m21 approximates m22.

Note that as described above, when m11 and m21 approximate m12 and m22, respectively, m12 can be greater than m11, and m21 can be greater than m22 depending on, for example, colors indicated by the image signals.

Moreover, in the first and third embodiments, it has described that the noise reduction device 1 reduces noise included in both the image signal G and the image signal R. However, the noise reduction device 1 may be configured to reduce noise included in one of the image signal G or the image signal R.

For example, the case where the noise reduction section 10 according to the first embodiment reduces noise included in the image signal G will be described.

In this case, the addition ratio determining section 12 may include a table in which the correlation flag F is associated with the first addition ratio, and the table is set such that when the value of the correlation flag F is relatively high, that is, when each of first degrees of correlation between the image signal G and the image signal R is relatively high, a relatively high value is provided to m12 of the first addition ratio. Moreover, the addition ratio determining section 12 outputs first addition ratios based on correlation flags F. Based on the first addition ratios each expressed as m11:m12, the weighted addition averaging section 13 performs first weighted addition averaging processes to generate an image signal GA, and outputs the image signal GA instead of the image signal G. Note that the addition ratio determining section 12 may determine each first addition ratio such that m11 equals m12 as the value of the correlation flag F increases.

Moreover, when noise included in the image signal G is reduced by the noise reduction section 10 according to the first embodiment, the correlation detector 11 may increase the value of the correlation flag F as the signal level of an image signal obtained by adding up and averaging the corresponding pixels between the image signal G and the image signal R decreases.

Next, for example, the case where noise included in the image signal G is reduced by the noise reduction section 20 according to the third embodiment will be described. In this case, the addition ratio determining section 21 includes a table in which the correlation flag F is associated with the first addition ratio, and determines each of first addition ratios m11:m12 based on the value of the correlation flag F. Moreover, the addition ratio determining section 21 may adjust each first addition ratio so that m11 equals m12 as the signal levels of the image signal G and the image signal R decrease. Alternatively, as the signal levels decrease, m11 may be reduced, and m12 may be increased so that m11 approximates m12.

Note that as described above, when noise included in one of the image signals is reduced, the noise reduction device 1 may output the other image signal without being adjusted. Moreover, in this case, when the correlation flag F represents that the correlation is minimum, m11 is set to a maximum value, and as the value of the correlation flag F increases, m11 may be reduced, and m12 may be increased so that m11 approximates m12. When m11 approximates m12, m12 can be greater than m11 depending on, for example, colors indicated by the image signals.

Moreover, in the first to fourth embodiments, when the correlation is maximum, the correlation flag F may be 0, and when the correlation is minimum, the correlation flag F may be 3. In this case, as the value of the correlation flag F decreases, the correlation increases.

Moreover, in the fifth to eighth embodiments, when the correlation is maximum, the values of the correlation flag F1 and the correlation flag F2 may be 0, and when the correlation is minimum, the values of the correlation flag F1 and the correlation flag F2 may be 3. In this case, as the values of the correlation flags F1, F2 decrease, the correlation increases.

Moreover, in the noise reduction device 1 according to the fifth to eighth embodiments, noise included in the image signal B is reduced, but in order to reduce noise included in the image signal G and the image signal R, the noise reduction device 1 of any of the first to fourth embodiments may be used. In this case, noise included in the image signal G and the image signal R can also be reduced in addition to noise included in the image signal B.

Moreover, the image signal input to the noise reduction device 1 of the first to eighth embodiments is obtained from, for example, an image pickup device. The image pickup device may be an image pickup device, such as a single-plate system camera, in which color filters are arranged in two-dimensionally different positions, or may be an image pickup device, such as a three-plate system camera to which a spatial pixel offset method is applied, in which a plurality of image pickup devices are bonded to each other with offsets in the horizontal direction and in the vertical direction. The image signal may be an image signal captured by a single-plate system camera, an image signal captured by a three-plate system camera, or an image signal in which image locations of a subject differ depending on colors due to the influence of the chromatic difference of magnification of an optical system. In these cases, it is preferable to correct a relative phase of an image signal of each color by an interpolating process using a two-dimensional filter in advance so that positions of a subject image represented by pixels included in the image signals coincide in all colors.

Moreover, as the image signal input to the noise reduction device 1 according to the first to eighth embodiments, the RGB signal has been described, but the image signal may be a plurality of image signals obtained from an identical image. For example, the plurality of image signals may be cyan, magenta, and yellow image signals obtained form an identical image, or may be an RGGB signal of, for example, a so-called four-plate system camera, in which a G signal includes output signals from two image pickup devices. Moreover, the plurality of image signals may include image signals of the same color. That is, of a plurality of image signals included in an image, at least two image signals may be used.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted based on the doctrine of equivalents and other applicable judicial doctrines.

The noise reduction device according to the present disclosure can effectively reduce random noise included in image signals, and thus is applicable to image processing devices for processing moving images and still images. Specifically, the noise reduction device according to the present disclosure is applicable to electronic devices such as digital still cameras, digital video cameras, camera-equipped mobile phones, smartphones, and monitoring cameras.

What is claimed is:

1. A noise reduction device comprising:
a noise reduction section configured to reduce noise included in an image signal, wherein
the noise reduction section includes
a first correlation detector configured to receive, as the image signal, first and second image signals obtained from an identical image, detect correlations between corresponding pixels between the first and second image signals, and output, based on the detected correlations, first degrees of correlation between the corresponding pixels,
a first addition ratio determining section configured to determine, based on the first degrees of correlation, first addition ratios based on which the corresponding pixels are added up in first weighted addition averaging processes, and
a first weighted addition averaging section configured to perform, based on the first addition ratios, the first weighted addition averaging processes on the corresponding pixels to generate a first output image signal from the first and second image signals, and output the first output image signal instead of the first image signal, and
when each of the first degrees of correlation is relatively high, the first addition ratio determining section provides a relatively high proportion of the pixel of the second image signal in the first addition ratio.

2. The noise reduction device of claim 1, wherein
the first addition ratio determining section determines each of the first addition ratios expressed as m11:m12 such that m11 approximates m12 as the first degree of correlation increases,
where m11 is a proportion of the pixel of the first image signal, and m12 is a proportion of the pixel of the second image signal in the first addition ratio, where m11+m12=1.

3. The noise reduction device of claim 2, wherein
the first addition ratio determining section adjusts each of the first addition ratios such that m11 approximates m12 as signal levels of the first and second image signals decrease.

4. The noise reduction device of claim 1, wherein
as a signal level of an image signal obtained by adding up and averaging the corresponding pixels between the first and second image signals decreases, the first correlation detector increases the first degrees of correlation to be output.

5. The noise reduction device of claim 1, wherein
the first addition ratio determining section is configured to determine, based on the first degrees of correlation, second addition ratios based on which the corresponding pixels are added up in second weighted addition averaging processes, and
the first weighted addition averaging section is configured to perform, based on the second addition ratios, the second weighted addition averaging processes on the corresponding pixels to generate a second output image signal from the first and second image signals, and output the second output image signal instead of the second image signal, and
when each of the first degrees of correlation is relatively high, the first addition ratio determining section provides a relatively high proportion of the pixel of the first image signal in the second addition ratio.

6. The noise reduction device of claim 5, wherein
as a signal level of an image signal obtained by adding up and averaging the corresponding pixels between the first and second image signals decrease, the first correlation detector increases the higher first degrees of correlation to be output.

7. The noise reduction device of claim 5, wherein
the first addition ratio determining section adjusts each of the first addition ratios expressed as m11:m12 and each of the second addition ratios expressed as m21:m22 such that m11 and m21 approximate m12 and m22, respectively, as the first degree of correlation increases,
where m11 is a proportion of the pixel of the first image signal, and m12 is a proportion of the pixel of the second image signal in the first addition ratio, where m11+m12=1, and m21 is a proportion of the pixel of the first image signal, and m22 is a proportion of the pixel of the second image signal in the second addition ratio, where m21+m22=1.

8. The noise reduction device of claim 7, wherein
the first addition ratio determining section adjusts each of the first addition ratios and each of the second addition ratios such that m11 and m21 approximate m12 and m22, respectively, as signal levels of the first and second image signals decrease.

9. The noise reduction device of claim 5, further comprising:
the noise reduction section including K noise reduction sections, where K is an integer greater than or equal to 2;
a band splitter configured to split each of at least two of image signals obtained as the image signal from an identical image into K types of frequency components to generate the first image signal including K first image signals and the second image signal including K second image signals, and output K groups of the first image signals and the second image signals to the different noise reduction sections, where one of the K first image signals and one of the K second image signals which have a same frequency are organized into each of the K groups; and
a band synthesizer configured to band-synthesize the first output image signal including K first output image signals and the second output image signal including K second output image signals, where the first and second output image signals are output from the first weighted addition averaging sections included in the K noise reduction sections.

10. The noise reduction device of claim 9, wherein
as signal levels of the first and second image signals organized into a lowest frequency group of the K groups of the first and second image signals decrease, the first addition ratio determining sections included in the K noise reduction sections adjusts each of the first addition ratios expressed as m11:m12 and each of the second addition ratios expressed as m21:m22 such that m11 and m21 approximate m12 and m22, respectively,
where m11 is a proportion of the pixel of the first image signal, and m12 is a proportion of the pixel of the second image signal in the first addition ratio, where m11+m12=1, and m21 is a proportion of the pixel of the first image signal, and m22 is a proportion of the pixel of the second image signal in the second addition ratio, where m21+m22=1.

11. The noise reduction device of claim 9, wherein
as a signal level of an image signal obtained by adding up and averaging the corresponding pixels between the first and second image signals in the lowest frequency group of the K groups of the first and second image signals decreases, the first correlation detectors included in the K noise reduction sections increases the first degrees of correlation to be output.

12. The noise reduction device of claim 1, wherein
the noise reduction section includes
a second correlation detector configured to receive, as the image signal, the first and second image signals and a third image signal which are obtained from an identical image, detect correlations between corresponding pixels between the first and third image signals, and output, based on the detected correlations, second degrees of correlation between the corresponding pixels,
a second addition ratio determining section configured to determine, based on the second degrees of correlation, third addition ratios based on which the corresponding pixels between the first and third image signals are added up in third weighted addition averaging processes, and
a second weighted addition averaging section configured to perform the third weighted addition averaging processes on the corresponding pixels between the first and third image signals to generate a third output image signal from the first and third image signals, and output the third output image signal instead of the first image signal, and
an addition averaging section configured to perform addition averaging processes on the corresponding pixels between the first and third image signals to generate a fourth output image signal from the first output image signal and the third output image signal, and output the fourth output image signal, and
when each of the second degrees of correlation is relatively high, the second addition ratio determining section provides a relatively high proportion of the pixel of the third image signal in the third addition ratio.

13. The noise reduction device of claim 12, wherein
the first addition ratio determining section adjusts each of the first addition ratios expressed as m31:m32 such that m32 increases as the first degree of correlation increases, and
the second addition ratio determining section adjusts each of the third addition ratios expressed as n31:n33 such that n33 increases as the second degree of correlation increases,
where m31 is a proportion of the pixel of the first image signal, and m32 is a proportion of the pixel of the second image signal in the first addition ratio, where m31+m32=1, and n31 is a proportion of the pixel of the first image signal, and n33 is a proportion of the pixel of the third image signal in the third addition ratio, where n31+n33=1.

14. The noise reduction device of claim 13, wherein
the first addition ratio determining section adjusts each of the first addition ratios such that m32 increases as signal levels of the first and second image signals decrease, and
the second addition ratio determining section adjusts each of the third addition ratios such that n33 increases as signal levels of the first and third image signals decrease.

15. The noise reduction device of claim 12, wherein
as signal levels of the first and second image signals decrease, the first correlation detector increases the first degrees of correlation to be output, and
as signal levels of the first and third image signals decrease, the second correlation detector increases the second degrees of the correlation to be output.

16. The noise reduction device of claim 12, further comprising:
the noise reduction section including K noise reduction sections, where K is an integer greater than or equal to 2;
a band splitter configured to split each of at least three of image signals obtained as the image signal from an identical image into K types of frequency components to generate the first image signal including K first image signals, the second image signal including K second image signals, and the third image signal including K third image signals, and output K groups of the first image signals, the second image signals, and the third image signals to the different noise reduction sections, where one of the K first image signals, one of the K second image signals, and one of the K third image signals which have a same frequency are organized into each of the K groups; and
a band synthesizer configured to band-synthesize the fourth output image signal including K fourth output image signals output from the addition averaging sections included in the K noise reduction sections.

17. The noise reduction device of claim 16, wherein
the first addition ratio determining sections included in the K noise reduction sections adjusts each of the first addition ratios expressed as m31:m32 such that m32 increases as signal levels of the first and second image signals in a lowest frequency group of the K groups of the first image signals, the second image signals, and the third image signals decrease, and
the second addition ratio determining sections included in the K noise reduction sections adjusts each of the third addition ratios expressed as n31:n33 such that n33 increases as signal levels of the first and third image signals in the lowest frequency group of the K groups of the first image signals, the second image signals, and the third image signals decrease,
where m31 is a proportion of the pixel of the first image signal, and m32 is a proportion of the pixel of the second image signal in the first addition ratio, where m31+m32=1, and n31 is a proportion of the pixel of the first image signal, and n33 is a proportion of the pixel of the third image signal in the third addition ratio, where n31+n33=1.

18. The noise reduction device of claim 16, wherein
as signal levels of the first and second image signals in a lowest frequency group of the K groups of the first image signals, the second image signals, and the third image signals decrease, the first correlation detectors included in the K noise reduction sections increases the first degrees of correlation to be output, and
as signal levels of the first and third image signals in a lowest frequency group of the K groups of the first image signals, the second image signals, and the third image signals decrease, the second correlation detectors included in the K noise reduction sections increases the second degrees of correlation to be output.

19. A noise reduction method for reducing noise included in an image signal, the method comprising:
a first step of receiving, as the image signal, first and second image signals obtained from an identical image, detecting correlations between corresponding pixels between the first and second image signals, and obtaining, based on the obtained correlations, degrees of correlation between the corresponding pixels;

a second step of determining, based on the degrees of correlation, addition ratios based on which the corresponding pixels are added up in a weighted addition averaging processes; and a third step of performing, based on the addition ratios, the weighted addition averaging processes on the corresponding pixels to generate an output image signal from the first and second image signals, and replacing the first image signal with the output image signal, wherein in the second step, when each of the degrees of correlation is relatively high, a relatively high proportion of the pixel of the second image signal in the addition ratio is provided.

* * * * *